United States Patent [19]
Yamaguchi et al.

[11] Patent Number: 5,650,984
[45] Date of Patent: Jul. 22, 1997

[54] METHOD FOR CAUSING A LIGHT BEAM TO JUMP FROM AN INITIAL TRACK TO A TARGET TRACK

[75] Inventors: Hiroyuki Yamaguchi, Hirakata; Mitsurou Moriya, Ikoma; Toshiyuki Kinou, Hirakata; Shinichi Yamada, Katano, all of Japan

[73] Assignee: Matsushita Electric Industrial Co., Ltd., Kadoma, Japan

[21] Appl. No.: 463,041

[22] Filed: Jun. 5, 1995

Related U.S. Application Data

[62] Division of Ser. No. 226,881, Apr. 13, 1994.

[30] Foreign Application Priority Data

| Apr. 13, 1993 | [JP] | Japan | 5-85963 |
| Mar. 2, 1994 | [JP] | Japan | 6-32556 |
| Mar. 31, 1994 | [JP] | Japan | 6-62681 |

[51] Int. Cl.$^6$ .................................................. G11B 7/00
[52] U.S. Cl. ................................ 369/32; 369/44.28
[58] Field of Search .................... 369/44.26, 44.27, 369/44.28, 44.29, 54, 32

[56] References Cited

U.S. PATENT DOCUMENTS

| 4,106,058 | 8/1978 | Romeas et al. | 369/32 |
| 4,858,214 | 8/1989 | Baba | 369/32 |
| 4,899,325 | 2/1990 | Katsuhara et al. | 369/32 |
| 5,012,460 | 4/1991 | Popovich et al. | 369/32 |
| 5,121,373 | 6/1992 | Barton et al. | 369/44.28 |
| 5,140,570 | 8/1992 | Nagasawa et al. | 369/44.28 |
| 5,146,440 | 9/1992 | Yamaguchi et al. | 369/32 |
| 5,177,719 | 1/1993 | Yamada et al. | 369/32 |
| 5,195,069 | 3/1993 | Nakano | 369/32 |
| 5,257,250 | 10/1993 | Moriya et al. | 369/32 |
| 5,268,883 | 12/1993 | Yamaguchi et al. | 369/32 |
| 5,309,417 | 5/1994 | Onodera et al. | 369/32 |
| 5,319,623 | 6/1994 | Yamada et al. | 369/32 |
| 5,398,224 | 3/1995 | Takahashi | 369/44.28 |
| 5,442,604 | 8/1995 | Osada | 369/44.28 |
| 5,511,051 | 4/1996 | Rokutan et al. | 369/44.28 |

FOREIGN PATENT DOCUMENTS 63-298717  12/1988  Japan.

*Primary Examiner*—Nabil Hindi
*Attorney, Agent, or Firm*—Ratner & Prestia

[57] ABSTRACT

A method and apparatus for jumping from an initial track to a target track on a medium having tracks of alternating polarity uses a combination of two-track and one-track jumps to jump to the target track. Detection of the jump middle-point for a two-track jump includes detecting a zero crossing in a tracking error signal. Detection of the jump middle-point for a one-track jump includes detecting a zero-crossing in a differential signal generated according to the tracking error signal. A target track several tracks away may be reached using consecutive two-track jumps, and if necessary, a single one-track jump.

7 Claims, 18 Drawing Sheets

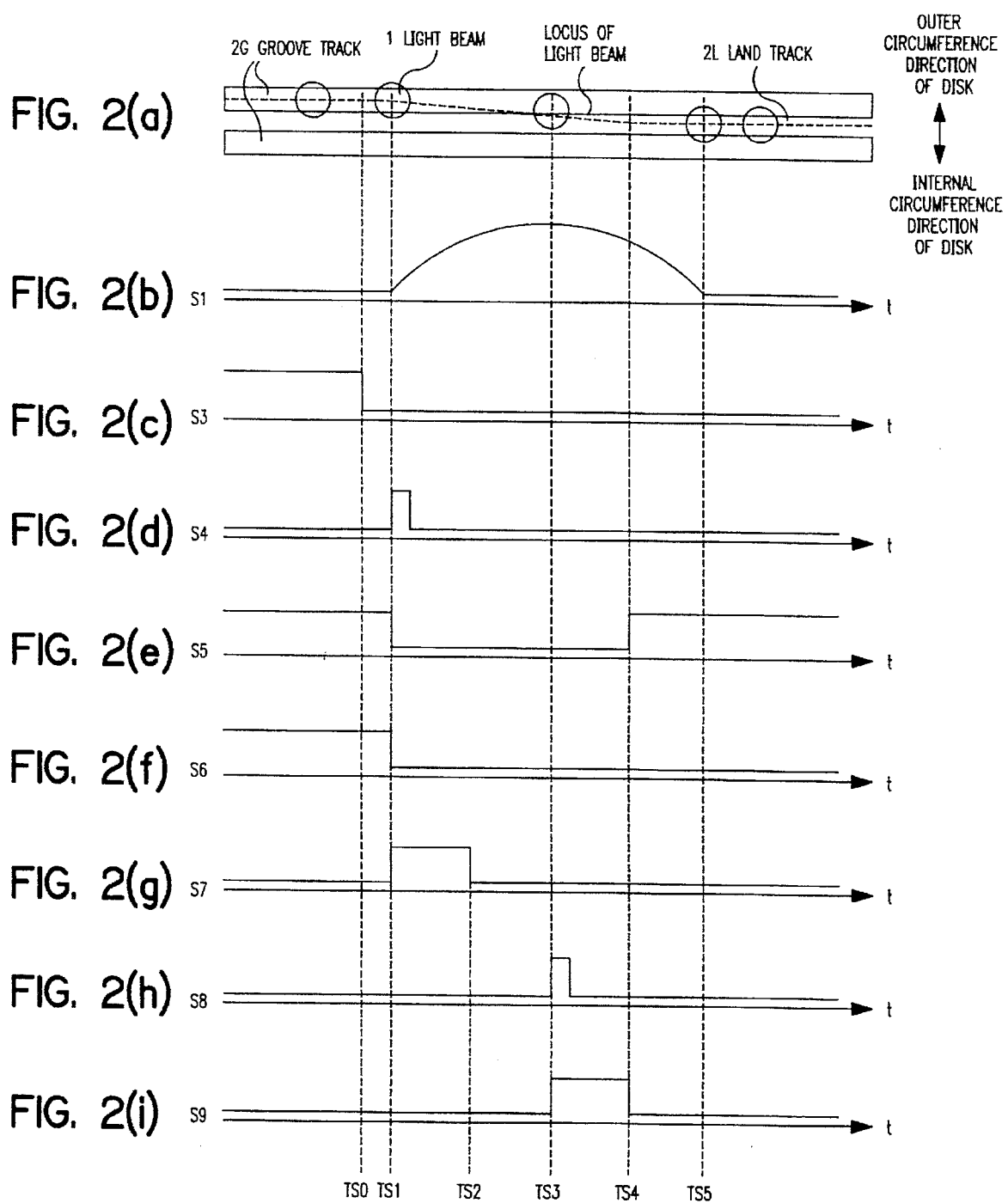

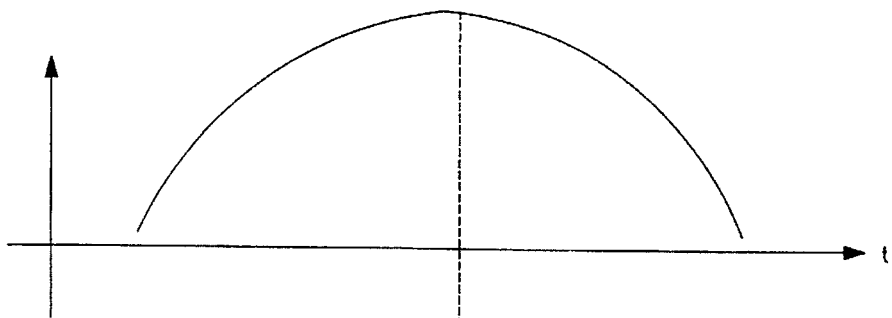
FIG. 5(a) S1
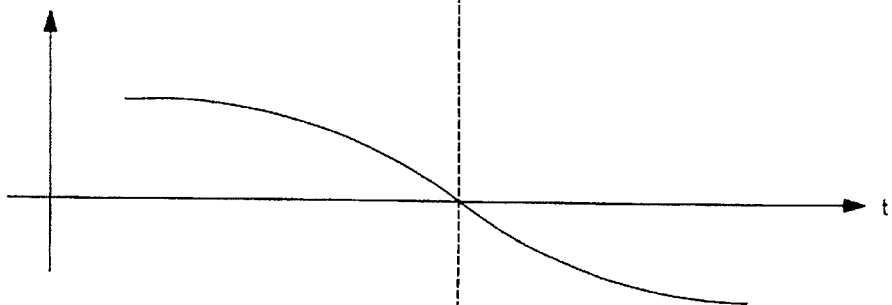
FIG. 5(b) S27
FIG. 5(c) S8

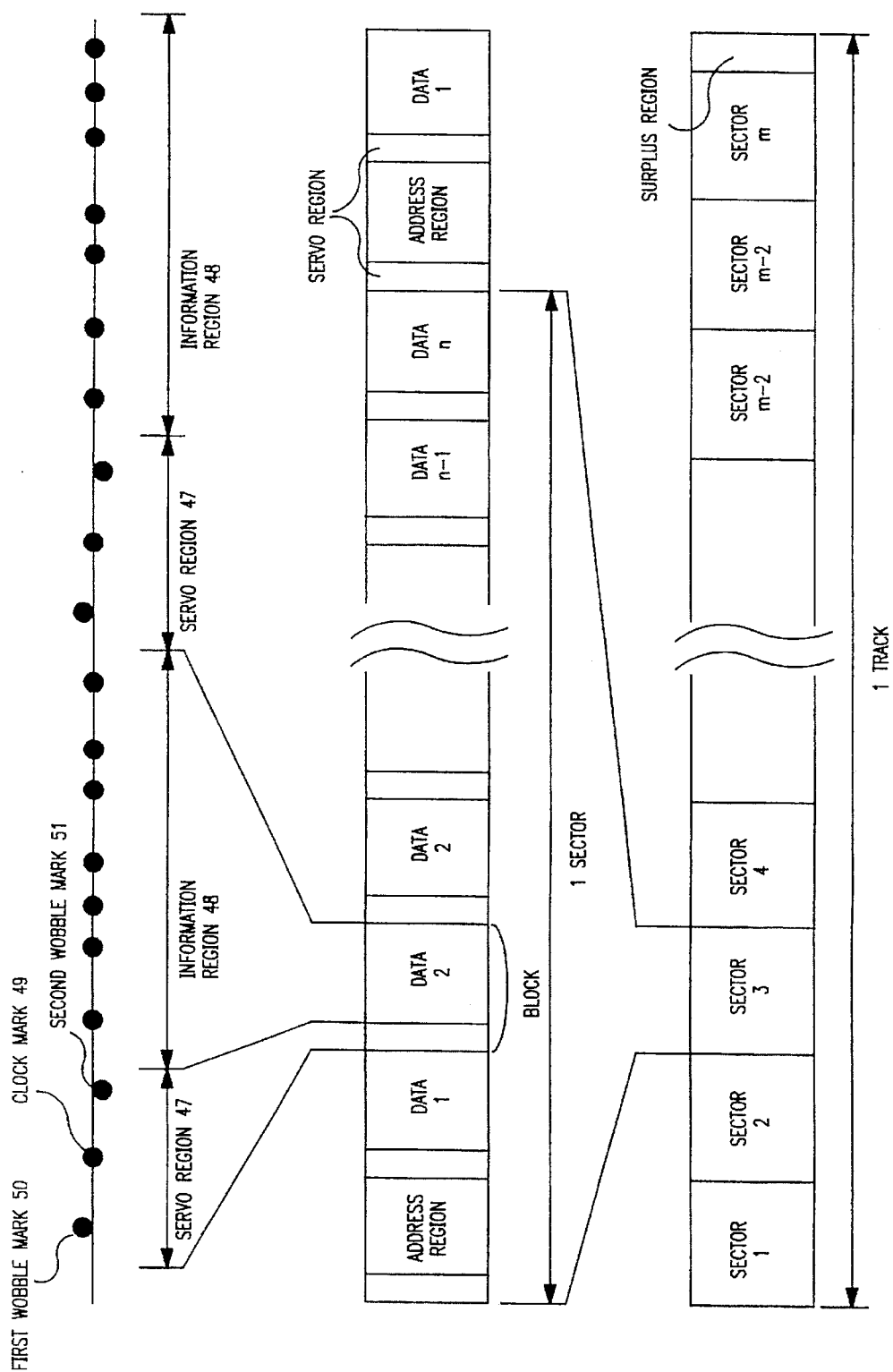

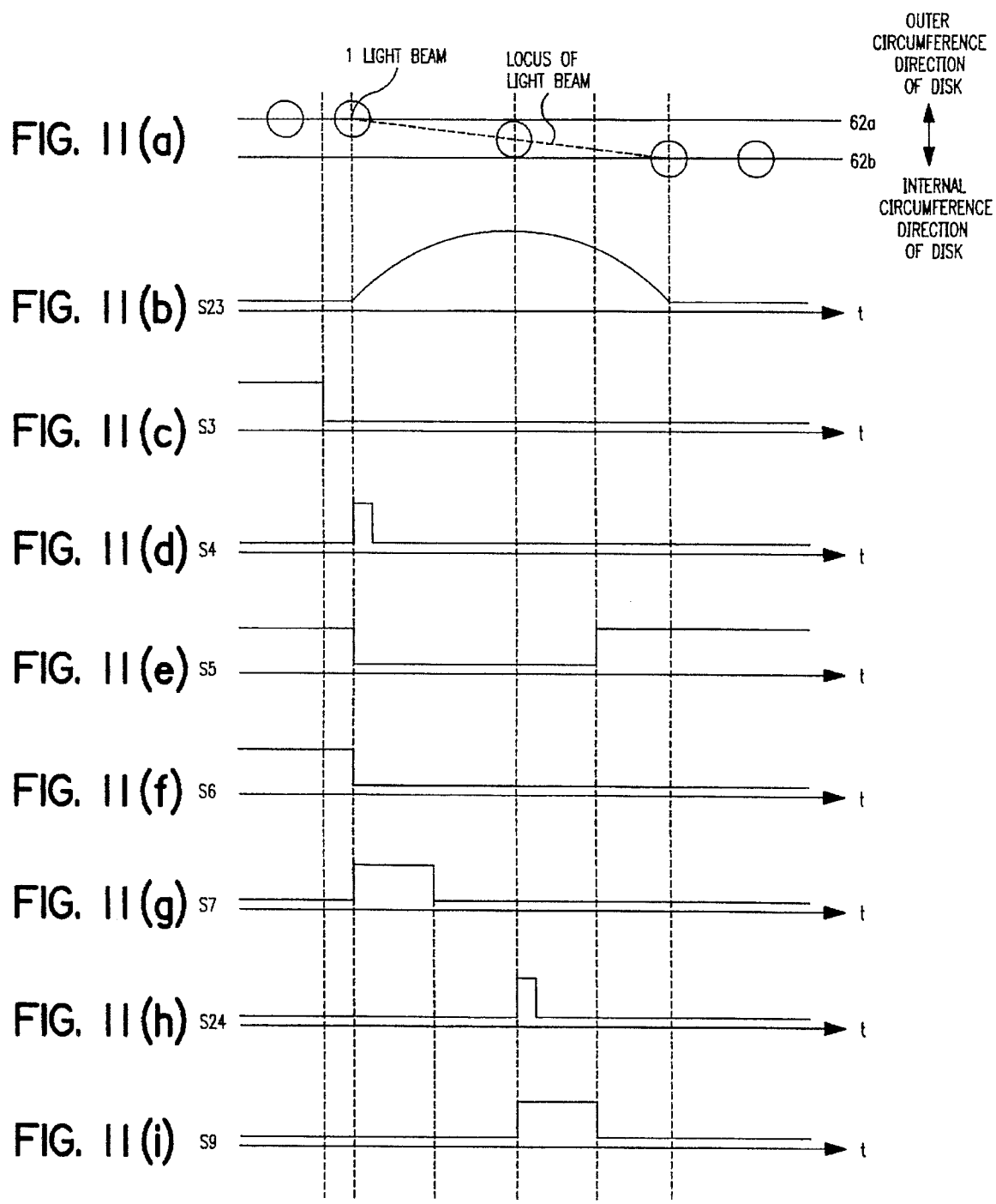

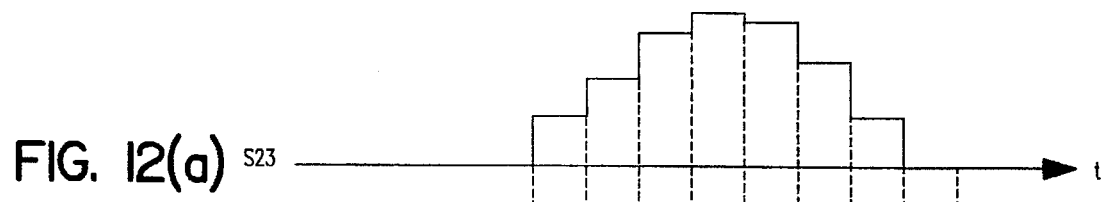
FIG. 12(a) S23
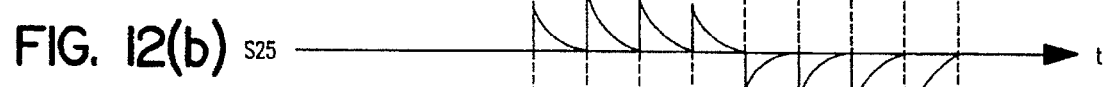
FIG. 12(b) S25
FIG. 12(c) S26
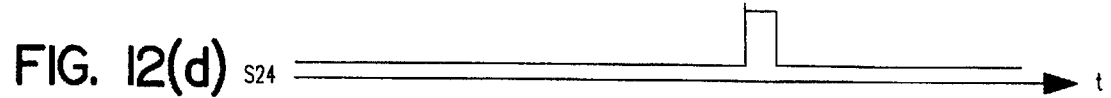
FIG. 12(d) S24

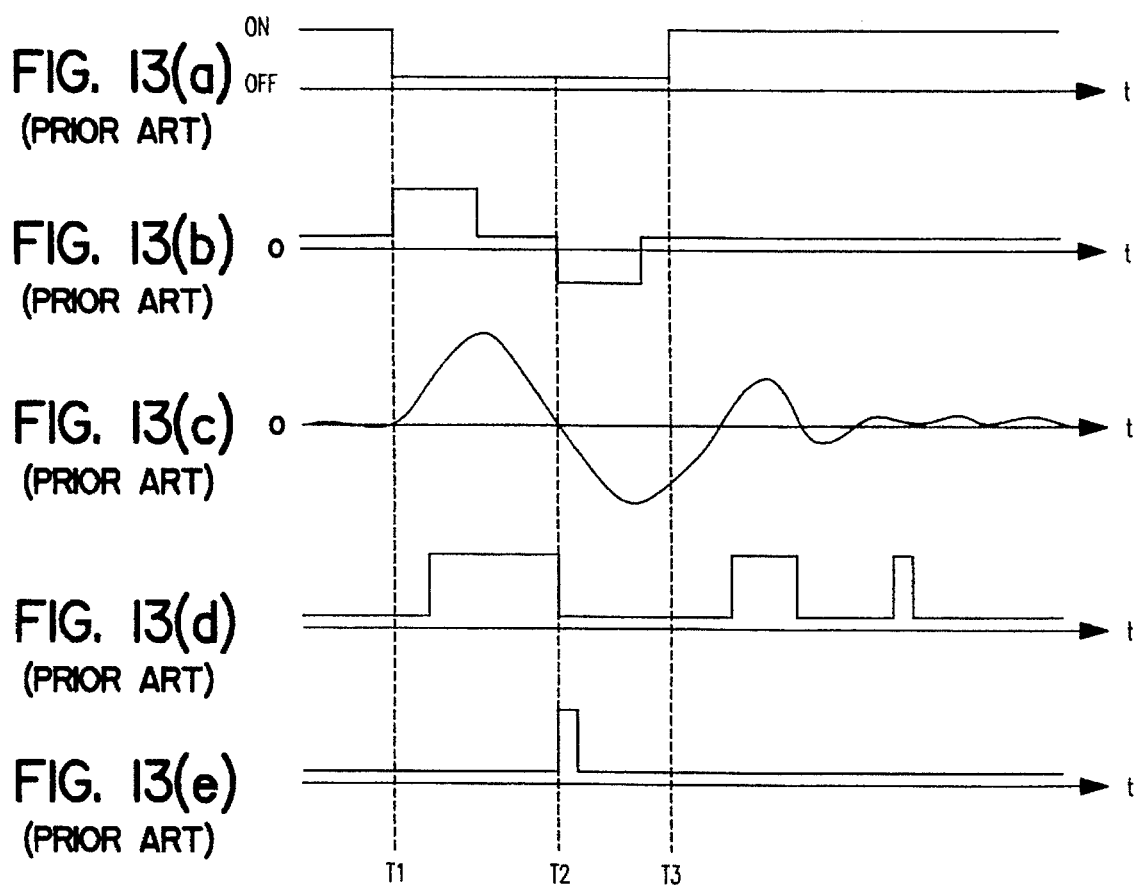

METHOD FOR CAUSING A LIGHT BEAM TO JUMP FROM AN INITIAL TRACK TO A TARGET TRACK

This application is a division of application Ser. No. 08/226,881, filed Apr. 13, 1994, (status:pending).

BACKGROUND OF THE INVENTION

1. Field of the Invention

The present invention relates to a track retrieving method for making a light beam instantaneously jump and scan from one track to another, thereby reading/writing information from/into a disk having the tracks of a spiral shape or a concentric circle shape. The present invention relates to a method for detecting a middle point between the tracks, the method being required for the track retrieving method, and to an apparatus for use in the methods. In particular, the present invention relates to a jumping scanning method.

2. Description of the Related Art

Several kinds of optical reading/writing apparatuses have been conventionally proposed. Examples of an information medium for use in the optical recording/reproducing apparatus include a disk in which a recording film made of a material capable of optically writing and reading data is deposited by a vapor deposition or the like on a substrate having concentric-circle like tracks in a concave and convex structure. In the optical writing/reading apparatus, a light beam emitted from a light source of a semiconductor laser or the like is irradiated onto such a disk, thereby recording and reproducing data. More particularly, for example, in the case of writing data, the power of the light beam is strongly or weakly modulated in accordance with the data, thereby recording the data by changing the reflectivity of the recording film of the disk. In the case of reproducing data, the power of the light beam is set to be uniform and comparatively weak, thereby reading the data by changing the power of light reflected from the disk.

Such an optical recording/reproducing apparatus performs a focus control for controlling the light beam so as to be always in a schematically predetermined convergent state on the recording film, and a tracking control for controlling the light beam so as to always correctly scan a predetermined track. Furthermore, as is described in detail in Japanese Patent Application No. 63-298717, the apparatus also performs a jumping scan for shifting the light beam from one track to its adjacent one.

The jumping scan is usually performed by means of a tracking shift mechanism applied for the tracking control. The tracking shift mechanism makes the light beam shift relatively with respect to the track in a direction perpendicular to the stretcher direction of the track and horizontal to the disk surface (i.e., in the direction of the disk radius).

The operation of the conventional jumping scan, when applied from a track to its adjacent one on the side of an internal circumference of the disk, will be described as follows with reference to FIGS. 13(a)–13(e) and 14(a)–14(b).

FIG. 13(a)–13(e) is a timing chart for the jumping scan. FIG. 13(a) is the timing chart of a tracking control ON/OFF signal; FIG. 13(b) is the timing chart of a drive signal for the tracking shift mechanism; FIG. 13(c) is the timing chart of the tracking error signal; FIG. 13(d) is the timing chart of a binary signal of the tracking error signal; and FIG. 13(e) is the timing chart of a track middle-point detection signal for detecting a middle point between adjacent tracks. FIG. 14(a) shows a positional relationship between a light beam 1 and a track 2 on the disk surface; and FIG. 13(b) is a plot of the tracking error signal corresponding to respective positions of the light beam 1.

First, the tracking control ON/OFF signal is set at an OFF level at the timing of T1, as shown in FIG. 13(a), thereby making the tracking control non-operational. Simultaneously, a rectangular-shaped acceleration pulse is applied to the tracking shift mechanism, as shown in FIG. 13(b), thereby making the light beam accelerated to shift toward a target track. After the acceleration pulse is completed, a drive signal to the tracking shift mechanism is set at zero level, so that the light beam is shifted by the inertia. At the time when the light beam reaches nearly the middle point between adjacent tracks, that is, at the timing of T2, a deceleration pulse is applied to the tracking shift mechanism, thereby decelerating the light beam. The deceleration pulse has a reverse polarity, although it has the same rectangular shape as that of the acceleration pulse. After the deceleration pulse is completed, the tracking control ON/OFF signal is set at an ON level at the timing of T3, thereby again operating the tracking control. Because of the tracking control, the light beam is pulled into the adjacent track, thereby completing the jumping scan.

In the above jumping scan, it is important to detect with high accuracy the middle point between adjacent tracks, i.e., a track middle point, in order to generate the deceleration pulse at an appropriate timing. The detection of the track middle point will be described as follows:

The detection of the track middle point is performed by detecting an edge of a binary signal of the tracking error signal, after the acceleration pulse is completed. The tracking error signal shows a positional relative relationship between the track and light beam. It is known that the tracking error signal is detected by a push-pull method, with respect to a track having a concave and convex structure with an optical depth of λ/8 (λ: a wavelength of the light beam). As is shown in FIG. 14(b), the tracking error signal draws a sine wave in accordance with the positional relative relationship between the light beam 1 and track 2. The cycle of the sine wave is equal to a track pitch. When the light beam 1 is on a track center, the amplitude of the sine wave is at zero level. In the case of performing the jumping scan, the polarity of the tracking error signal is inverted with respect to the track center as shown in FIG. 13(c), and the binary signal of the tracking error signal becomes as shown in FIG. 13(d). Therefore, in the jumping scan toward an outer circumference direction of the disk, the detection of the track middle point is implemented by detecting a rise edge, after the acceleration pulse is completed. That is, a fall edge of the binary signal of the tracking error signal is detected, after the acceleration pulse is completed, thereby generating a track middle-point detection signal as shown in FIG. 13(e).

In recent years, several kinds of high density disk formats have been proposed for the purpose of increasing a capacity of an optical disk. As an example, an optical disk of a land/groove format (hereinafter, referred to as "an L/G disk") is included. FIG. 15 shows an external appearance view of an L/G disk. The L/G disk will be described below with reference to FIG. 15.

The conventional optical disk has used, as a track, either a groove for the tracking control, or a land which is an intermediate region between the grooves, thereby recording information. On the contrary, the L/G disk uses both lands and grooves as the track, for recording data thereon.

Accordingly, the track pitch becomes equal to ½ of the conventional one. Thus, the capacity of the optical disk can be made double-fold. In the L/G disk, groove tracks (i.e., hunting portions in FIG. 15) using the groove and land tracks (i.e., portions each sandwiched by the groove tracks) using the land are alternatively coupled to each other for each rotation. As a result, the groove and land tracks form a single spiral shape, whereby a continuous recording or reproduction of data can be made possible without any interruption on the entire disk. Moreover, respective tracks have a corresponding address section. As a result, the tracks can be distinguished from one another. The address sections are matched to one another in a circumference direction of the disk and each provided a forward corresponding land-groove transition section. Such an L/G disk is referred to as a one-spiral L/G disk, since the tracks form a single spiral shape on the disk.

FIG. 16 is an enlarged view of a circled portion of FIG. 15 including the address sections and land-groove transition sections. The transition sections are provided for each rotation of the disk and matched to one another in the circumference direction regardless of the radius direction of the track. Each groove is configured to a convex structure so that its optical length d satisfies the relationship of $d=8/\lambda$ with respect to the wavelength $\lambda$. Each land track is a flat portion without any grooves. Therefore, when moving on the single spiral-shaped track, the light beam will alternatively be on the groove track and the land track alternatively for each rotation. Addresses of each address section of the convex structure are formed as a pit series. It is known that by the power of the reflected light varied by the pit series, the address section on which the light beam is located can be read. The pit width of the respective addresses is thinner than the track width and the pit length is approximately in the range of from a radius to a diameter of the light beam.

FIG. 17 shows an external appearance view of an L/G disk of a type different from that of FIGS. 15 and 16. The L/G disk of FIG. 17 has land tracks and groove tracks adjacent to each other. The land tracks and the groove tracks respectively form a one-spiral shape. Accordingly, the land-groove transition section is not provided for each track, as is different from that of the L/G disk in FIG. 15. Such an L/G disk is referred to as a two-spiral L/G disk, since there exists two spirals of the lands and grooves, on the disk.

Even in this L/G disk, the land and groove tracks are alternatively provided in the radius direction of the disk, so that the polarity of the tracking control is inverted.

It is not necessary in the two-spiral L/G disk to switch the polarity of the tracking control for each track, in the case of scanning along the spiral. However, it is not possible to realize a continuous writing or reading of data on the entire disk. That is to say, for example, after data is written and read from the outer circumference to the internal circumference along the spiral of the groove track, the light beam should be again shifted to the most outer circumference, thereby writing and reading data in the spiral of the land track. Other structural characteristics of the two-spiral L/G disk are the same as those of the single spiral L/G disk.

FIGS. 18(a) and 18(b) show the positional relationship between the light beam 1 and tracks 2 on the above L/G disk, and the corresponding tracking error signal in a horizontal axis. In the L/G disk, the land region between the groove tracks which correspond to the conventional track becomes the land track. With respect to the groove tracks, the tracking error signal is exactly the same as that of the conventional disk. That is, when the light beam is in the center of the groove track, the tracking error signal draws the sine wave whose amplitude becomes a zero level, the cycle thereof being equal to the pitch of the groove track. The land track is provided at a position where a phase of the tracking error signal shifts at 180° with respect to the groove track. Therefore, the polarity of the tracking error signal is inverted between the groove track and land track.

As is mentioned above, the detection of the track middle point, which is indispensable for the jumping scan, is performed by detecting the edge of the binary signal of the tracking error signal. However, in the L/G disk, the edge does not correspond to the middle point between the groove track and land track. Therefore, the track middle point cannot be detected by the conventional method, so that the jumping scan cannot be performed.

The above is the same to a simple servo format disk of an inverted wobble system, to which the conventional method cannot be applied in order to detect the track middle point.

SUMMARY OF THE INVENTION

A method for detecting a middle point between adjacent tracks of an information medium, in which medium the polarity of a tracking control is alternatively inverted in the tracks, according to the present invention includes the steps of: irradiating a light beam onto the information medium, and detecting an off-track between the light beam and the track from one of light reflected on the recording medium and transmission light into the information medium, thereby generating an off-track signal corresponding to the off-track; generating a track middle-point signal corresponding to a differentiation signal obtained by calculating a differentiation of the off-track signal; and detecting a change in a polarity of the track middle-point signal, thereby detecting that the light beam reaches the middle point between the adjacent tracks.

In one embodiment of the invention, the step of generating the track middle-point signal includes a step of converting the off-track signal into a digital signal and a step of generating, as the track middle-point signal, a differential signal obtained by calculating a differential of the off-track signal converted into the digital signal.

In another embodiment of the invention, in the step of generating the track middle-point signal, the differentiation signal is generated as the track middle-point signal.

Alternatively, a track retrieving method for making a light beam shift on a target track, in an apparatus in which at least one of a writing operation and a reading operation of information is performed to an information medium, a tracking control being applied to the information medium so as to make the light beam shift on track, and the information medium having the tracks whose polarity of the tracking control is alternatively inverted therebetween, according to the present invention, includes the steps of: making the light beam shift toward an adjacent track, after the tracking control is made non-operational; detecting an off-track between the light beam and the track, thereby generating an off-track signal corresponding to the off-track; generating a track middle-point signal corresponding to a differentiation signal obtained by calculating a differentiation of the off-track signal; generating a deceleration pulse for decelerating a shift of the light beam, based on a change of a polarity of the track middle-point signal; inverting the polarity of the tracking control before the deceleration pulse is completed; and again operating the tracking control, after the deceleration pulse is completed, thereby making the light beam shift to the target track.

In one embodiment of the invention, the step of generating the track middle-point signal includes a step of converting the off-track signal into a digital signal and a step of generating, as the track middle-point signal, a differential signal obtained by calculating the differential of the off-track signal converted into the digital signal.

In another embodiment of the invention, in the step of generating the track middle-point signal, the differentiation signal is generated as the track middle-point signal.

In still another embodiment of the invention, the information medium is an optical disk of a sample servo system, the medium having plural sets of wobble marks, which are discretely provided, for detecting the off-track, an orientation of a first set of the wobble marks being opposed to an orientation of a second set of the wobble marks adjacent to the first set of the wobble marks; in the step of generating the off-track signal, the off-track signal is generated as a discrete signal read from the plural sets of the wobble marks; and the step of detecting the track middle-point signal includes a step of calculating the differentiation of the off-track signal and a step of sampling and holding a peak value of respective chopping-wave shaped signals each corresponding to the discrete off-track signal obtained by the differentiation.

Alternatively, in a track retrieving method, according to the present invention, for making a light beam shift on a target track, in an apparatus in which at least one of a writing operation and a reading operation of information is performed to an information medium, a tracking control is applied to the information medium so as to make the light beam shift on track, and the information medium having the tracks whose polarity of the tracking control is alternatively inverted therebetween, a combination of two-track jumping scan for performing a jumping scan for a track apart from two tracks and one-track jumping scan for performing the jumping scan for an adjacent track is performed, thereby making the light beam shift on the target track.

In one embodiment of the invention, a track retrieving method includes the steps of: making the light beam shift to one of the target track and a track adjacent to the target track by the two-track jumping scan, and making the light beam shift onto the target track by the single track jumping scan, in the case where the light beam is shifted to the track adjacent to the target track.

In another embodiment of the invention, the target track is a track apart from N tracks and the one-track jumping scan and two-track jumping scan are performed for $N_1$ times and $N_2$ times, respectively, thereby making the light beam shift to the target track, wherein, $N_1$ and $N_2$ satisfy $N_1=0$ and $N_2=N/2$, in the case where N is an even number; and $N_1=1$ and $N_2=(N-1)/2$, in the case where N is an odd number.

In still another embodiment of the invention, the one-track jumping scan includes the steps of: making the light beam shift to an adjacent track, after the tracking control is made non-operational; detecting an off-track between the light beam and the track, thereby generating an off-track signal corresponding to the off-track; generating a track middle-point signal corresponding to a differentiation signal obtained by calculating a differentiation of the off-track signal; generating a deceleration pulse for decelerating a shift of the light beam, based on a change in a polarity of the track middle-point signal; inverting the polarity of the tracking control before the deceleration pulse is completed; and again operating the tracking control, after the deceleration pulse is completed.

In still another embodiment of the invention, the step of generating the track middle-point signal includes a step of converting the off-track signal into a digital signal and a step of generating, as the track middle-point signal, a differential signal obtained by calculating a differential of the off-track signal converted into the digital signal.

In still another embodiment of the invention, in the step of generating the track middle-point signal, the differentiation signal is generated as the track middle-point signal.

In still another embodiment, the two-track jumping scan includes the steps of: making the light beam shift to an adjacent track, after the tracking control is made non-operational; detecting a track-off between the light beam and the track, thereby generating an off-track signal corresponding to the off-track; generating a deceleration pulse for decelerating a shift of the light beam, based on a change in the polarity of the off-track signal; and again operating the tracking control, after a deceleration pulse is completed.

Alternatively, an apparatus in which at least one of a writing operation and a reading operation of information is performed to an information medium, the information medium having tracks whose polarity of a tracking control is alternatively inverted, according to the present invention, includes an off-track signal generation means for detecting an off-track between a light beam and the track, thereby generating an off-track signal corresponding to the off-track; a tracking control means for performing the tracking control so as to make the light beam shift on the track; a switch means for switching an operational state and an non-operational state of the tracking control; an acceleration means for making the light beam shift to an adjacent track, after the tracking control is made non-operational by the switch means; a track middle-point detection means for generating a track middle-point signal corresponding to a differentiation signal obtained by calculating a differentiation of the off-track signal; a deceleration means for generating a deceleration pulse for decelerating a shift of the light beam, based on a change in a polarity of the track middle-point; and a means for applying to the switch means a signal for operating the tracking control again, after the deceleration pulse is completed.

In one embodiment of the invention, the track middle-point detection means includes a means for converting the off-track signal into a digital signal and differential means for generating, as the track middle-point signal, a differential signal obtained by calculating a differential of the off-track signal converted into the digital signal.

In another embodiment of the invention, the track middle-point detection means is a differentiation means for generating the differentiation signal as the track middle-point signal.

In still another embodiment of the invention, the information medium is an optical disk of a sample servo system, the medium having plural sets of wobble marks, which are discretely provided, for detecting the off-track, an orientation of a first set of the wobble marks being opposed to an orientation of a second set adjacent to the first set of the wobble marks; the off-track signal generation means generates the off-track signal as a discrete signal which is read from the plural sets of the wobble marks; and the track middle-point detection means includes a differentiation means for calculating a differentiation of the off-track signal and a sample-and-hold means for sampling and holding a peak value of respective chopping-wave shaped signals each corresponding to the discrete off-track signal obtained by the differentiation means, thereby producing a track middle-point signal.

A method for detecting a track middle point according to the present invention is used for an information medium having tracks whose polarity is alternatively inverted. First, a light beam is irradiated to the information medium, and then an off-track between the light beam and track is detected from either reflected light from the information medium or transmission light thereinto. Then, an off-track signal corresponding to the off-track is generated. Next, a track middle-point signal (including a differential signal) is generated. The track middle-point signal corresponds to a differentiation signal obtained by calculating a differentiation of the off-track signal. In such an information medium, a shift of the off-track becomes zero in a middle point between the tracks. Therefore, by detecting a change in the polarity of the track middle-point signal, it can be detected that the light beam reaches the middle point between the adjacent tracks.

Application of this method makes possible a one-track jumping scan to the information medium.

Thus, the invention described herein makes possible the advantages of (1) providing a track middle-point detecting method for detecting a middle point between tracks in a high density disk such as an L/G disk, (2) providing a track retrieving method for making a light beam shift to an adjacent track in the high density disk such as the L/G disk, and (3) providing an apparatus in which the track retrieving method is implemented.

These and other advantages of the present invention will become apparent to those skilled in the art upon reading and understanding the following detailed description with reference to the accompanying figures.

BRIEF DESCRIPTION OF THE DRAWINGS

FIGS. 2(a) to 2(i) are timing charts of a track retrieving operation.

FIGS. 5(a) to 5(c) are are timing charts of a track middle-point detection using a differentiation circuit.

FIGS. 10(a) to 10(c) are diagrams showing a format of an SS disk.

FIGS. 11(a) to 11(c) are timing charts of a jumping scan.

FIGS. 12(a) to 12(d) are timing charts of a track middle-point detection.

FIGS. 13(a) to 13(e) are timing charts of a conventional jumping scan.

DESCRIPTION OF THE PREFERRED EMBODIMENTS

Hereinafter, the present invention will be described by way of examples, with reference to the accompanying drawings.

EXAMPLE 1

Figure 1:
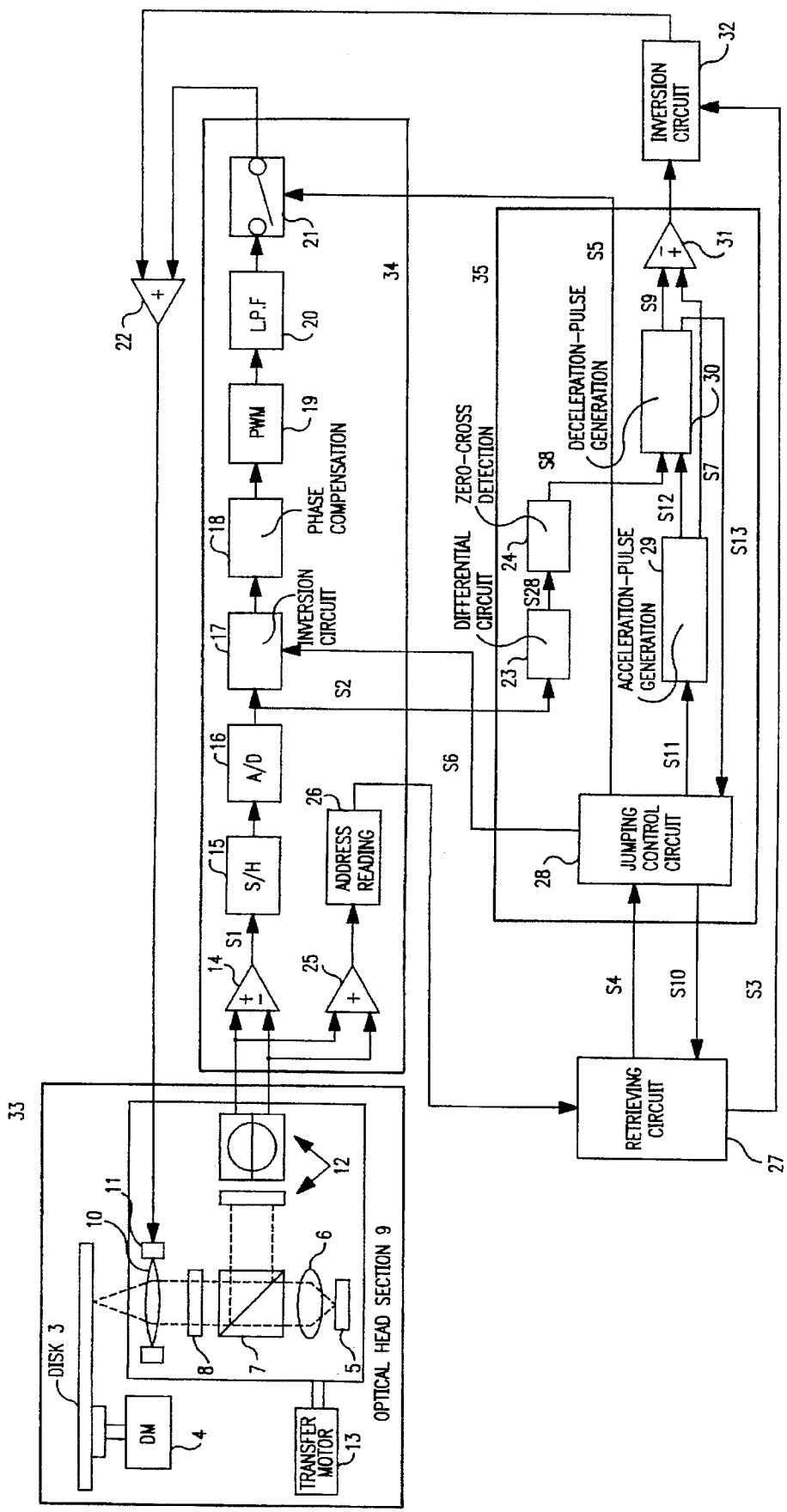
FIG. 1 is a structural diagram of a track retrieving apparatus as a first example of the present invention.

FIG. 1 is a structural diagram of a track retrieving apparatus, in which a jumping scanning method of the present invention is realized as a first example. Hereinafter, the structure of the track retrieving apparatus of this example will be described.

The track retrieving apparatus is generally split into three blocks: i) a disk/head block 33 for irradiating a light beam to a disk and receiving light from the disk, ii) a tracking control block 34 consisting of a circuit for realizing a tracking control by a digital control and a circuit for reading an address, and iii) a jumping scanning block 35 for performing a jumping scan for one track. A detailed structure and operation of respective blocks 33, 34, and 35 will be described below.

First, the structure of the disk/head block 33 will be described. The disk/head block 33 consists of a disk 3 which is an information medium, a disk motor 4 for rotating the disk 3, a optical head section 9 for irradiating the light beam to the optical disk 3, and a transfer motor 13 for transferring the optical head section 9.

The optical head section 9 includes a light source 5 of a semiconductor laser or the like; a coupling lens 6, a polarization beam splitter 7, ¼ wave plate 8, and an objective lens 10, on which the light beam emitted from the light source 5 is incident in this order; a tracking actuator 11; and a two-divided photodetector 12 on which the light beam from the disk 3 is incident. The tracking actuator 11 includes a movable portion having a coil for tracking and a fixed portion having a permanent magnet. The objective lens 10 is attached to the movable portion of the tracking actuators 11. The two-divided photodetector 12 has two divided light-receiving regions and its division line corresponds to a track direction on the light receiving face.

The operation of the disk/head block 33 in such a structure will be described. The disk 3 is rotated at a predetermined velocity by the disk motor 4. The light beam emitted from the light source 5 is collimated by the coupling lens 6. The collimated light beam travels through the poralization beam splitter 7 and ¼ wave plate 8 in this order, and is converged on the disk 3 by the convergent lens 10, thereby being irradiated therefrom. The light beam reflected from the disk 3 travels through the objective lens 10 and ¼ wave plate 8 in this order, and is reflected on the polarization beam splitter 7, thereby being irradiated onto the two-divided photodetector 12. Two light receiving regions of the two-divided photodetector 12 respectively convert the irradiation light into an electric signal, thereby outputting them to the tracking control block 34.

The position on the disk 3, to which the light beam is irradiated, is arranged by the transfer motor 13 and tracking actuator 11. The transfer motor 13 shifts the entire optical head section 9 in a radius direction of the disk 3. In the tracking actuator 11, a position of the fixed portion relative to the permanent magnet is shifted by an electromagnetic force generated in response to a current flowing in the coil of the movable portion. As a result, the tracking actuator 11 shifts the light beam in the radius direction of the disk 3, i.e., a direction across the track. The transfer motor 13 is used for shifting the entire optical head section 9 in the radius direction, and the tracking actuator 11 is used for shifting the light beam track by track.

Next, the structure and operation of the tracking control block 34 will be described. The tracking control block 34 consists of a circuit for the tracking control and a circuit for reading the address.

The circuit for the tracking control includes a differential circuit 14, sample-and-hold circuit 15, A/D converter 16, inversion circuit 17, phase compensation circuit 18, pulse width modulation (PWM) circuit 19, low pass filter 20, and switch 21.

Figure 15:
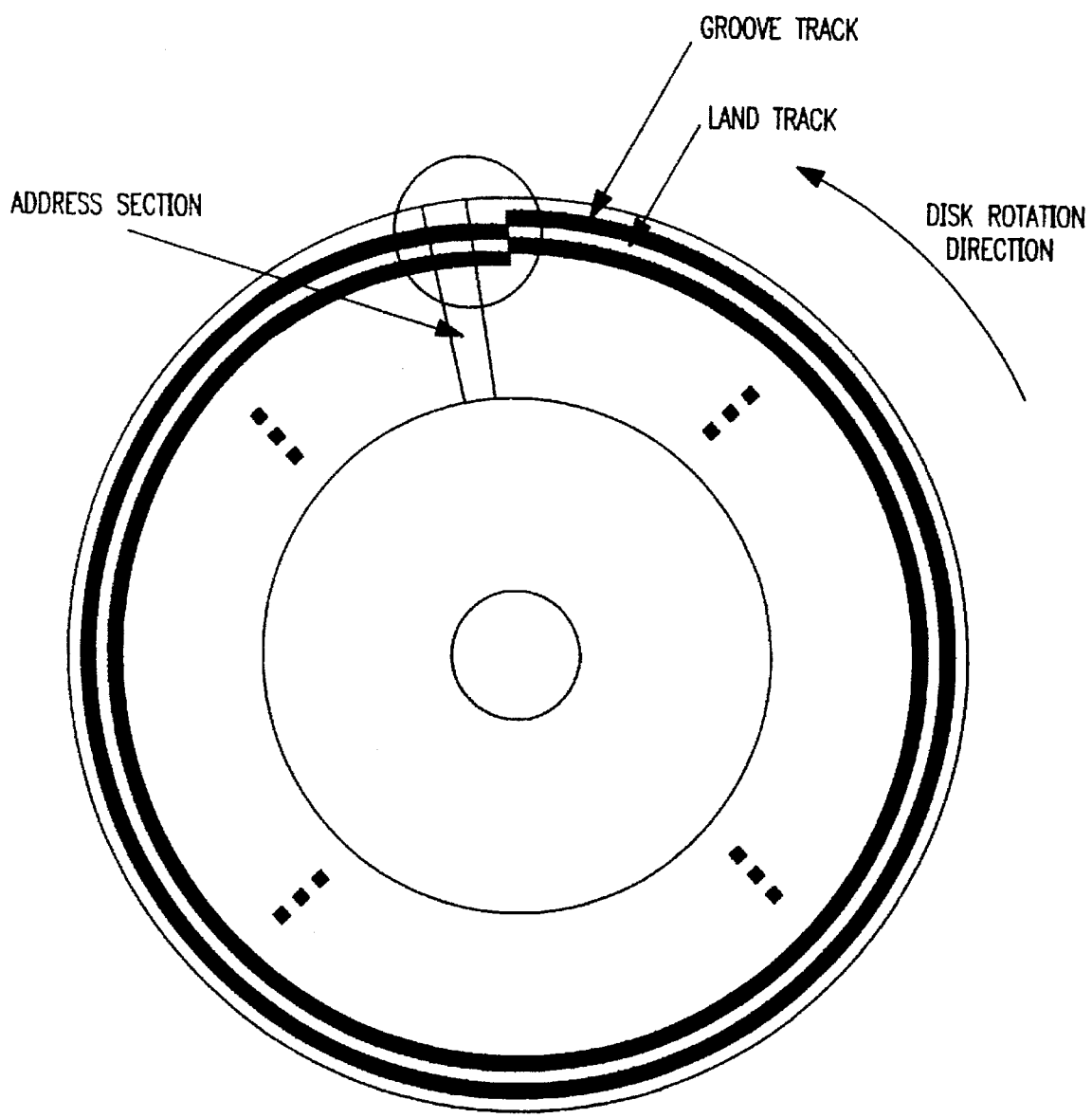
FIG. 15 is an external appearance view of a conventional spiral L/G disk.
Figure 16:
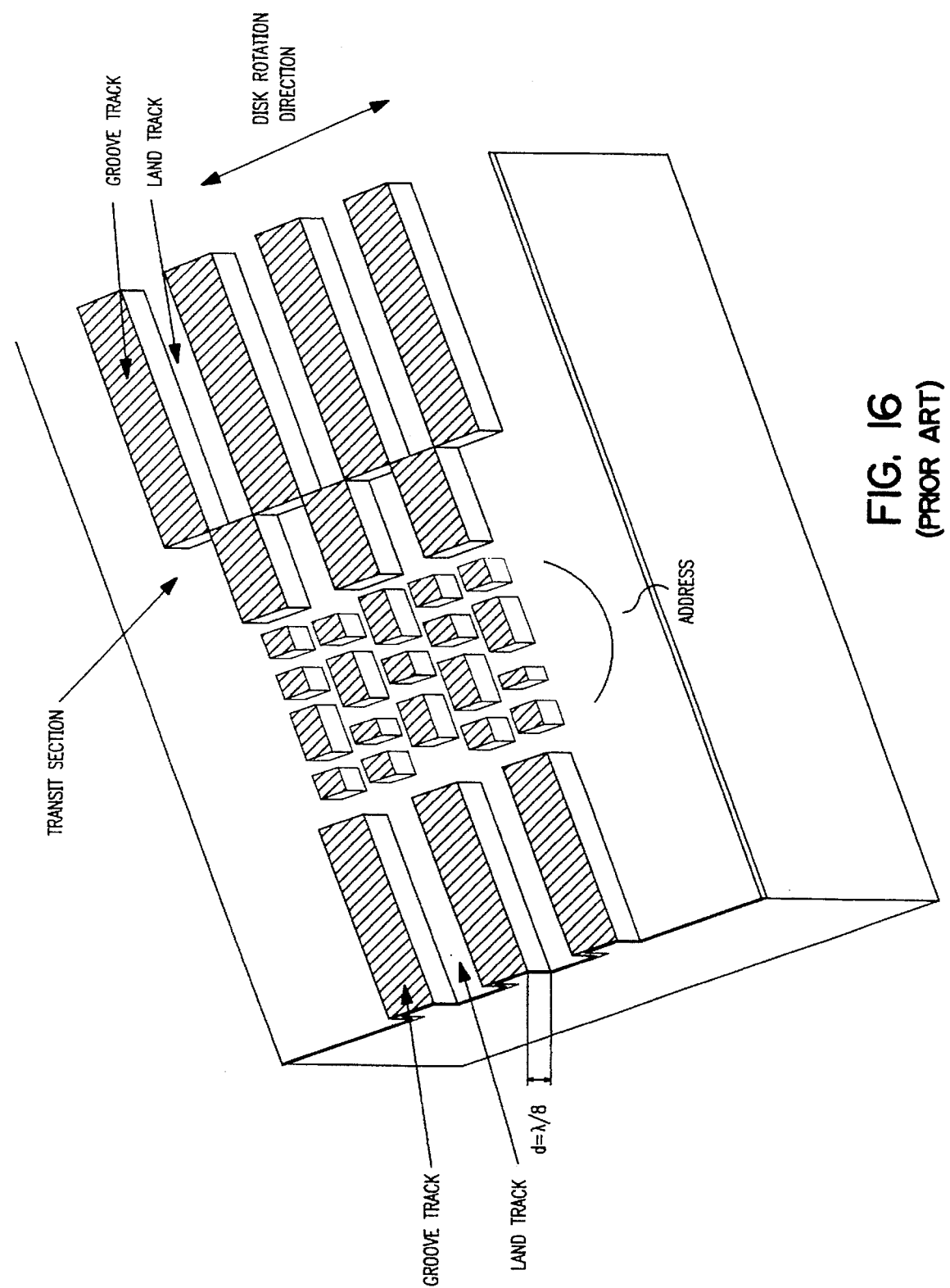
FIG. 16 is an enlarged external appearance view of a conventional L/G disk.
Figure 17:
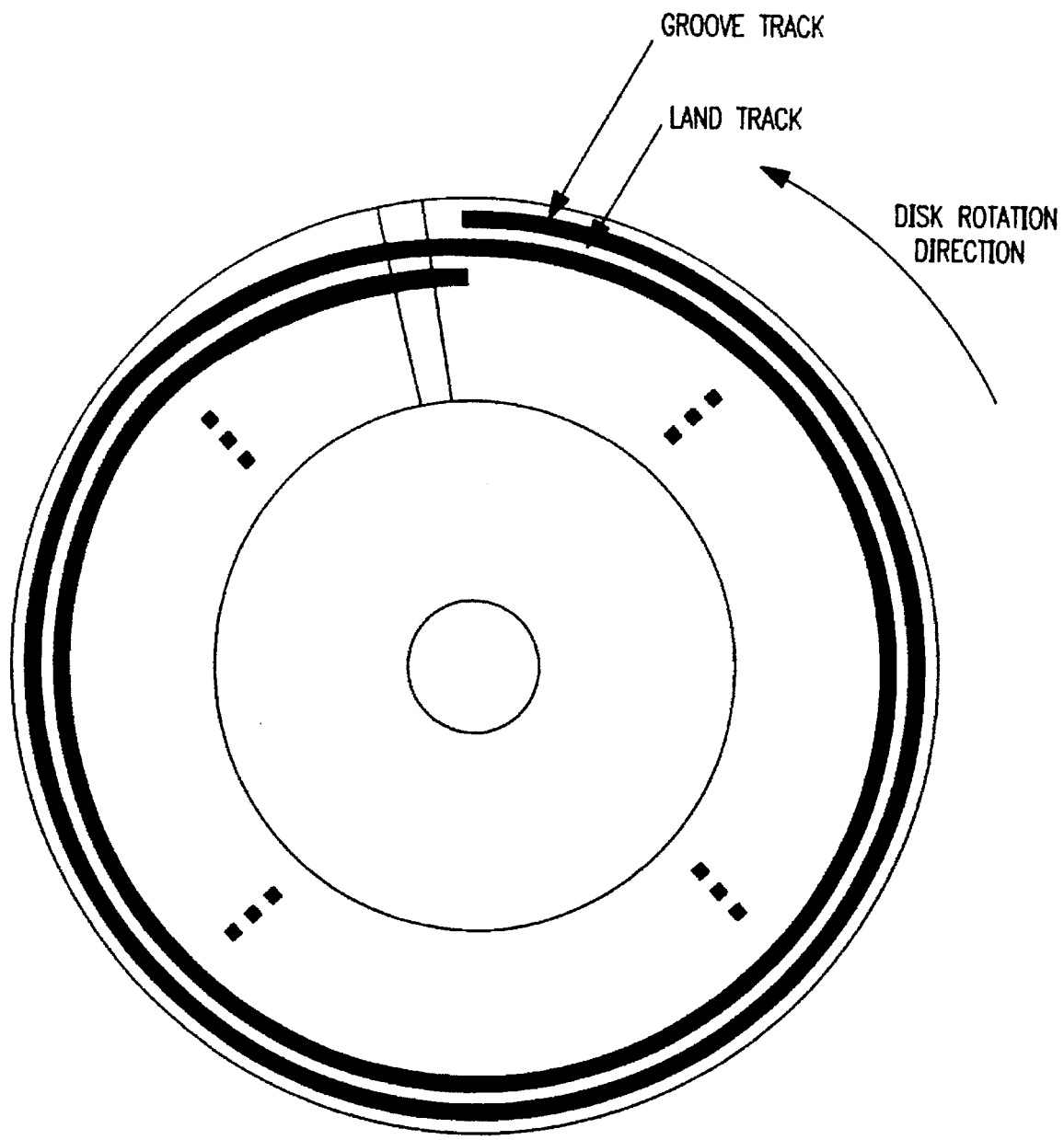
FIG. 17 is an external appearance view of a conventional two-spiral L/G disk.
Figure 18A:
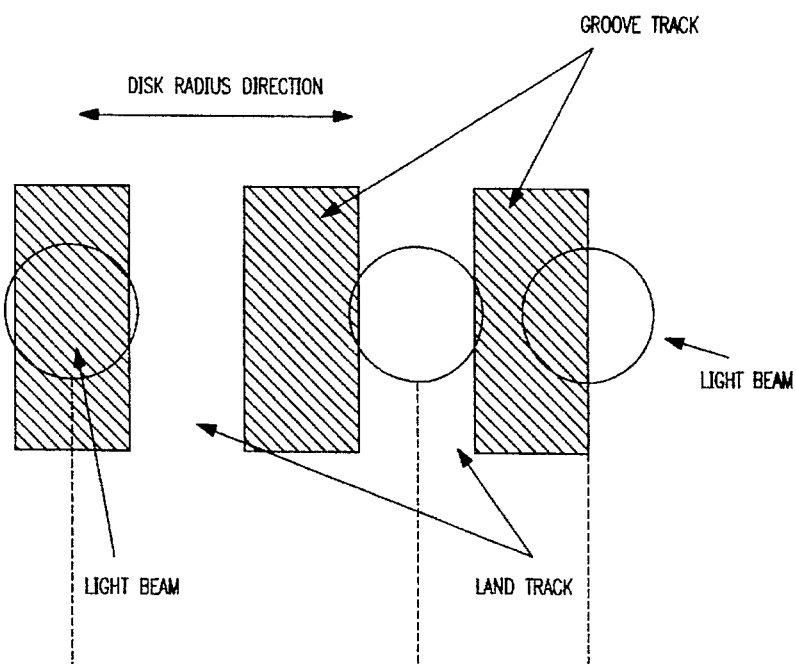
FIGS. 18(a) to 18(b) are diagrams showing a tracking error signal of a conventional L/G disk.
Figure 18B:
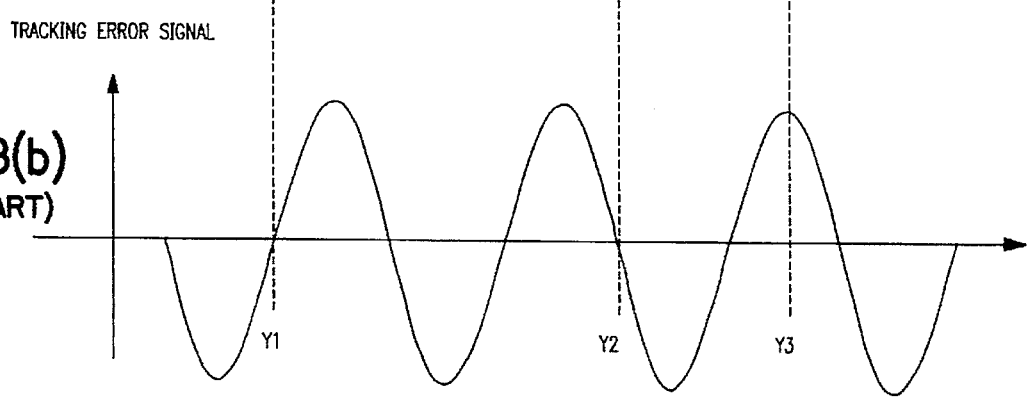

The signals, which are each outputted from the corresponding one of the two light receiving regions of the two-divided photodetector 12, are inputted into an inversion terminal and a non-inversion terminal of the differential circuit 14, respectively. It is widely known that a tracking error signal S1 can be detected by means of the differential circuit 14 with a push-pull method for the foregoing L/G disk shown in FIGS. 15 to 17. The tracking error signal S1, which is outputted from the differential circuit 14, travels through the sample-and-hold circuit 15 and is converted from an analog signal into a digital signal in the A/D converter 16. The sample-and-hold circuit 15 discretely samples the tracking error signal B1 and holds signals sampled for the period required for the A/D conversion. The inversion circuit 17 inverts the polarity of the tracking control of the tracking signal S1 which is converted into the digital signal by the A/D converter 16. An output signal from the A/D converter 16 is also outputted to the jumping scanning block 35.

The tracking error signal S1 whose polarity is inverted in the inversion circuit 17 is inputted into the phase compensation circuit 18. The phase compensation circuit 18 maintains control stability of the tracking control system. An output signal from the phase compensation circuit 18 is inputted into the PWM circuit 19. The PWM circuit 19 outputs a signal whose pulse width is modulated in accordance with an output of the digital signal of the phase compensation circuit 18. Its output cycle is equal to an A/D conversion cycle of the A/D converter 16. An output signal from the PWM circuit 19 is inputted into the low pass filter 20. The low pass filter 20 converts the output signal from the PWM circuit 19 into an analog signal. A cut-off frequency f lpf of the low pass filter 20 satisfies the relationship of f lpf<1/Tad with respect to the conversion cycle Tad of the A/D converter 16.

An output terminal of the low pass filter 20 is connected to the switch 21. The switch 21 switches an operational state and non-operational state of the tracking control. An output signal from the low pass filter 20 is applied to the tracking actuator 11 via an addition circuit 22, while the switch 21 remains closed. Accordingly, the light beam is controlled so as to be always nearly in the center of the track, while the switch 21 remains short-circuited.

The circuit for reading the address includes an addition circuit 25 and an address reading circuit 26. The respective output signals from the two light receiving regions of the two-divided photodetector 12 are also inputted into the addition circuit 25. The addition circuit 25 detects the sum of light reflected on the disk 3 and outputs the sum. The address reading circuit 26 reads addresses sections each provided for the corresponding one of the tracks of the disk 3 by an output signal from the addition circuit 25, thereby outputting respective address signals to a retrieving circuit 27.

When the address of a track that is to be detected (hereinafter, referred to as "a target track") is inputted into the retrieving circuit 27 by an external means (not shown), the retrieving circuit 27, in accordance with an output signal from the address reading circuit 26, controls the light beam to shift to the target track by repeating the jumping scan. From the retrieving circuit 27, a jumping command signal S4 is outputted to the jumping scanning block 35 and a jumping directional signal S3 is outputted to an inversion circuit 32.

Finally, the structure of the jumping scanning block 35 will be described. The jumping scanning block 35 includes a differential circuit 23, a zero-cross detection circuit 24, a jumping control circuit 28, an acceleration-pulse generation circuit 29, a deceleration-pulse generation circuit 30, and a differential circuit 31.

The output signal of the above A/D converter 16 is inputted into the zero-cross detection circuit 24 via the differential circuit 23. The zero-cross detection circuit 24 detects a zero cross of its input signal, thereby generating a trigger signal S8 and outputting it to the deceleration-pulse generation circuit 30.

The jumping command signal S4 from the above retrieving circuit 27 is inputted into the jumping control circuit 28. When receiving the jumping command signal S4, the jumping control circuit 28 outputs the required several kinds of jumping command signals and implements the jumping scan from a track to its adjacent one, thereby outputting a jumping completion signal S10 to the retrieving circuit 27, after the jumping scan is completed. Furthermore, from the jumping control circuit 28, an acceleration starting signal S11 is outputted to the acceleration-pulse generation circuit 29; a tracking control signal ON/OFF 85 is outputted to the switch 21; and a tracking polarity signal S6 is outputted to the inversion circuit 17 of the tracking control block 34.

The acceleration-pulse generation circuit 29 outputs an acceleration drive pulse S7 to a non-inversion terminal of the differential circuit 31; and the deceleration-pulse generation circuit 30 outputs a deceleration drive pulse S9 to an inversion terminal. The output of the differential circuit 31 is inputted into the tracking actuator 11 via the inversion circuit. 32 and the addition circuit 22. Moreover, the acceleration-pulse generation circuit 29 outputs an acceleration termination signal S12 to the deceleration-pulse generation circuit 30; and the deceleration-pulse generation circuit 30 outputs a deceleration termination signal S13 to the jumping control circuit 28.

The tracking retrieving operation in such a tracking retrieving apparatus will be described in detail by the accompanying timing chart of FIG. 2.

FIG. 2(a) is an enlarged plan view of the tracks on the disk 3, which shows two groove tracks 2G and a land track 2L sandwiched therebetween. In this figure, the vertical direction corresponds to a radius direction of the disk, and an upper direction corresponds to an outer circumference direction. An area of the light beam 1 is shown in a circle. The light beam 1 is shifted from the groove track 2G to the land track 2L located on the internal circumference side by one track by the jumping scan. Such a track retrieving operation is performed by repeating the jumping can. In this case, a locus of the light beam 1 is drawn as a dotted line.

FIGS. 2(b) to 2(i) show a timing chart of signals each corresponding to the locus position of the light beam 1. That is, FIG. 2(b) is the timing chart of the tracking error signal S1; FIG. 2(c) is the timing chart of the jumping directional signal S3; FIG. 2(d) is the timing chart of the jumping command signal S4; FIG. 2(e) is the timing chart of the tracking control ON/OFF signal S5; FIG. 2(f) is the timing chart of the tracking polarity signal S6; FIG. 2(g) is the timing chart of the acceleration drive pulse S7 outputted from the acceleration-pulse generation circuit 29; FIG. 2(h) is the timing chart of the trigger signal S8 outputted from the zero-cross detection circuit 24; and FIG. 2(i) is the timing chart of the deceleration drive pulse S9 outputted from the deceleration-pulse generation circuit 30.

Before the jumping scan commences, the tracking control ON/OFF signal S5, which is sent from the jumping control circuit 28 to the switch 21, is in a High level as shown in FIG. 2(e), and the switch 21 is closed. Accordingly, the tracking control is operational. Moreover, the tracking polarity signal S6 for determining the polarity of the tracking control, which is inputted from the jumping control circuit 28 to the inversion circuit 17, is in a High level as shown in FIG. 2(f). In this case, the inversion circuit 17 has polarity so that the light beam 1 is pulled into the groove track 2G by the tracking control. That is, the circuit 17 outputs an input signal without the inversion operation. Output signals of the acceleration-pulse generation circuit 29 and deceleration-pulse generation circuit 30 are respectively in a zero level, so that the differential circuit 31, to which these two signals are inputted, has also an output signal of a zero level. In this case, the tracking error signal S1 outputted from the differential circuit 14 is almost in a zero level; the light beam 1 is always on either the track 2G or 2L without causing a large control error; the address reading circuit 26 reads the address of the track 2G or 2L, on which the light beam 1 is currently located, each time the light beam 1 passes through the address section.

Before the jumping scan commences, an address of a target track is inputted into the retrieving circuit 27 by an external command means. When the address section is inputted, the retrieving circuit 27 gains from the address reading circuit 26 an address section of the track 2 (G) or 2L, on which the light beam 1 is currently located, thereby calculating the number of repetitions and determining the direction of the jumping scan. In accordance with the determined direction of the jumping scan, the retrieving circuit 27 sets the jumping directional signal S3 at the timing of TS0, as shown in FIG. 2(c). In the track retrieving operation toward the internal circumference direction, the jumping directional signal S3 is set at a Low level.

Next, as is shown in FIG. 2(d), the retrieving circuit 27 sets the jumping command signal S4 at a High level at the timing of TS1, and then immediately sets it again at a Low level, thereby outputting a positive pulse. When detecting a rise edge of the jumping command signal S4, the jumping control circuit 28 outputs a positive pulse as the acceleration staring signal S11. Simultaneously, the circuit 28 sets the tracking control ON/OFF signal S5 at a Low level at the timing of TS2. By such a process, the switch 21 becomes open, thereby making the tracking signal non-operational. At the same time, the jumping control circuit 28 sets the tracking polarity signal S6 at a Low level, as shown in FIG. 2(f). Then, the inversion circuit 17 commences the inversion operation, so that the polarity of an input signal is inverted and then outputted.

When a positive pulse is inputted as the acceleration starting signal S11 from the jumping control circuit 28, the acceleration-pulse generation circuit 29 outputs the acceleration drive pulse S7 having a predetermined crest value and pulse width as shown in FIG. 2(g). The acceleration drive pulse S7 is inputted into the tracking actuator 11 via the differential circuit 31, the inversion circuit 32, and the addition circuit 22 in this order. The inversion circuit 32 is set so that the jumping directional signal S3 in a Low level has the same polarity as that of the input signal, and the signal S3 in a High level is inverted and then outputted. Now, the jumping directional signal S3 is in a Low level, so the inversion circuit 32 will output a positive drive pulse having the same polarity as that of an input signal. In this case, the tracking actuator 11 is connected so that its own movable portion is shifted toward the internal circumference direction of the disk, which starts to make the light beam 1 accelerated to shift from the groove track 2G to its adjacent land track 2L on the internal circumference side. After completing to output the predetermined acceleration drive pulse S7 at the timing of TS2, the acceleration-pulse generation circuit 29 outputs an acceleration terminating signal S12, thereby indicating the completion of the acceleration drive pulse S7 to the deceleration-pulse generation circuit 30.

As the light beam 1 is shifted, the level of tracking error signals S1 increases. When the light beam 1 reaches the middle point between the groove track 2G and land track 2L at the timing of TS3, a positive pulse is outputted as the trigger signal S8 by the zero-cross detection circuit 24, as shown in FIG. 2(h). This detection of the track middle point will be described in more detail by using the timing chart of FIG. 3.

Figure 3A:
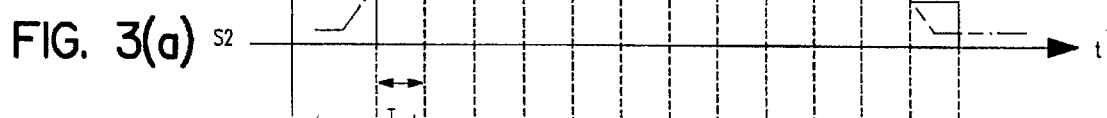
FIGS. 3(a) to 3(c) are timing charts of a track middle-point detection.

FIG. 3(a) is the timing chart of the tracking error signal S1 (shown by a dash-dot line) which is outputted from the differential circuit 14, and an output signal S2 of the A/D converter 16 (shown as a solid line) which is a digital value of the tracking signal S1, while the jumping scan is implemented as shown in FIG. 2. The output signal S2 has a stage shape, since the A/D converter 16 discretely converts at the cycle of Tad. In reality, the output signal S2 takes, for example, an 8-bit digital value. The digital value is shown as a horizontal axis for convenience of the explanation.

Figure 3B:
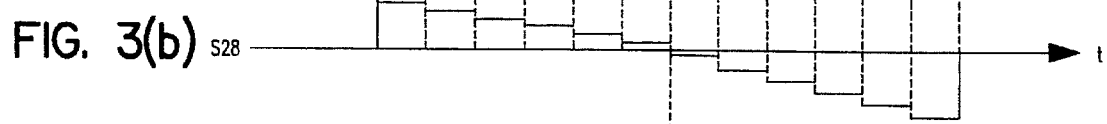
Figure 3C:
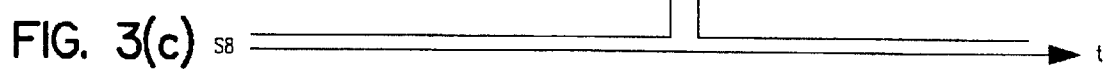

FIG. 3(b) is the timing chart of an output signal S28 of the differential circuit 23 and FIG. 3(c) is that of the trigger signal S8 outputted from the zero-cross detection circuit 24. In FIG. 3(b), a digital value of the output signal S28 from the differential circuit 23 is shown in the horizontal axis. The differential circuit 23 calculates a difference in the amplitude of the digitalized tracking error signal S2 from the A/D converter 16 by each sample at the cycle of Tad and outputs a differential signal to the zero-cross detection circuit 24. The zero-cross detection circuit 24 detects a change in the polarity of the differential signal and then detects that the light beam 1 reaches a middle point between the groove track 2G and land track 2L, thereby outputting, as the trigger signal S8, a positive pulse shown in FIG. 3(c) to the deceleration-pulse generation circuit 30.

The deceleration-pulse generation circuit 30 detects a rise edge of an initial trigger signal S8, after the acceleration drive pulse S7 is completed, thereby outputting at the timing of TS3 the deceleration drive pulse S9 having a predetermined crest value and pulse width. The deceleration drive pulse S9 is inverted in the differential circuit 31 and inputted into the tracking actuator 11 via the inversion circuit 32 and addition circuit 22, thereby decelerating a shift velocity of the light beam 1 toward the internal circumference direction by the acceleration drive pulse S7.

After the deceleration drive pulse S9 is completed at the timing of TS4, a deceleration-pulse generation circuit 30 outputs the deceleration termination signal S13 to the jumping control circuit 28. After the deceleration termination signal S13 is inputted into the jumping control circuit 28, the tracking control ON/OFF signal S5 is immediately set at a High level as shown in FIG. 2(e). This makes the switch 21 closed, thereby re-operating the tracking control. In this case, the light beam 1 is on the land track 2L which is on the internal circumference side by nearly one track, and the polarity of the tracking control has already been switched so as to be reverse with respect to the polarity of the groove track 2G. Therefore, the light beam 1 is pulled into the land track 2L without any interruption, thereby completing the jumping scan for one track.

After the jumping scan for one track is completed, the jumping control circuit 28 outputs the jumping completion signal S10 to the retrieving circuit 27. In response to this process, the retrieving circuit 27 reduces the number of repetitions of the jumping scan by one, the number having been calculated for the light beam 1 to reach the target track before the retrieving operation. The retrieving circuit 27 repeats the above jumping scan for one track, until the number of the jumping scan becomes zero, thereby reaching the target track and completing the retrieving operation.

In this example, the differential circuit 23 calculates a differential of the digitalized tracking error signal S2 from the A/D converter 16 and the zero-cross detection circuit 24 detects a change in the polarity of the differential signal, thereby detecting the track middle point. In general, the differential calculation can be substituted by the differentiation calculation in order to obtain its approximate value. In the jumping scan of this example, the detection of the track middle point can be used by a change in the polarity of the signal obtained by differentiating the digitalized tracking error signal S2.

Figure 4:
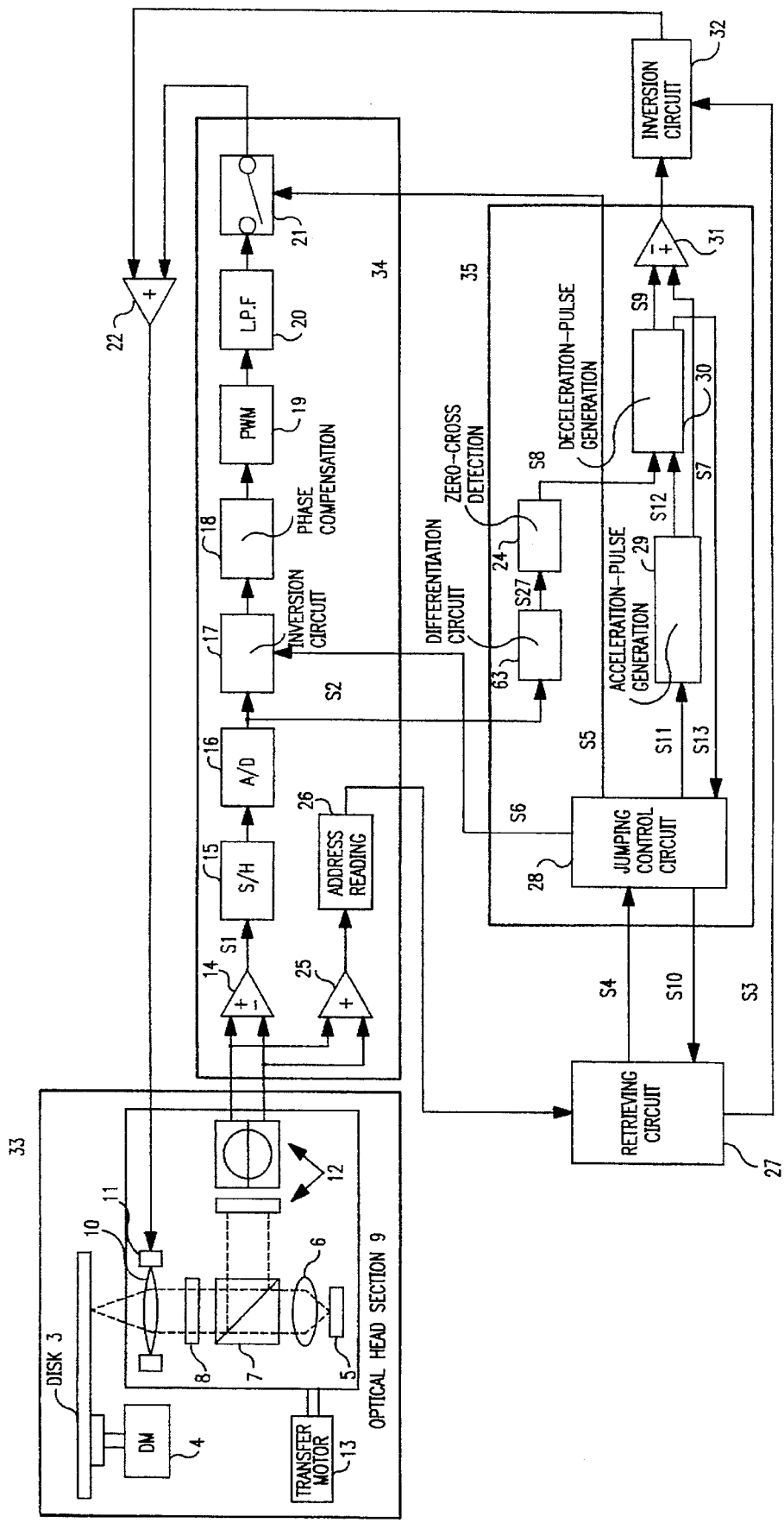
FIG. 4 is a structural diagram of a track retrieving apparatus using a track middle-point detection by the differentiation.

FIG. 4 shows a structure of the track retrieving apparatus, in which the detection of the track middle point by the differentiation is used. The structure and operation are the same as those in FIG. 1 except that a differentiation circuit 63 replaces the differential circuit 23 in FIG. 1. Thus, the explanation is omitted. The differentiation circuit 63 differentiates the digitalized tracking error signal S2 outputted from the A/D converter 16, thereby outputting a differentiation signal S27 to the zero-cross detection circuit 24.

FIGS. 5(a) to 5(c) show the timing chart of the detection of a track middle point using the differentiation circuit 63. FIG. 5(a) is the timing chart of the tracking error signal S1 outputted from the differential circuit 14 during the jumping scan. FIG. 5(b) is the timing chart of the differentiation signal S27 outputted from the differentiation circuit 63. FIG. 5(c) is the timing chart of the trigger signal S8 outputted from the zero-cross detection circuit 24. The differentiation circuit 63 becomes a zero level, when the light beam 1 reaches the middle points of the tracks. Then, the zero-cross detection circuit 24 outputs to the deceleration-pulse generation circuit 30 a positive pulse as the trigger signal S8, thereby detecting the track middle point.

In the above example, the retrieving operation for repeating the jumping scan toward the internal circumference direction is described. The retrieving operation toward the outer circumference direction can be realized in the same way. In this case, the retrieving circuit 27 should set the jumping directional signal S3 at a High level, before the retrieving operation commences. This leads to the inversion operation of the inversion circuit 32. Consequently, the acceleration drive pulse S7, which is outputted from the acceleration-pulse generation circuit 29, operates to accelerate and shift, toward the outer circumference direction, the tracking actuator 11 (i.e., the light beam 1 in a real sense). The deceleration-pulse generation circuit 30 operates to decelerate such a movement. The polarity of the tracking error signal S1, which is generated as the light beam 1 is shifted from the groove track 2G toward the land track 2L on the outer circumference side, is opposed to the descriptions of FIGS. 2(a) to 2(i) and 3(a) to 3(c). However, the middle point between the tracks can be detected in the same way, since the differential circuit 23 and zero-cross detection circuit 24 can operate under no influence of the polarity of the tracking error signal S1.

The jumping scan from the groove track 2G to the land track 2L is described here. However, in the jumping scan from the land track 2L to the groove track 2G, the middle point of the tracks can be detected in the same way and the jumping scan is stably operated, although the polarity of the tracking error signal S1 in such a jumping scan is opposite to the description of FIGS. 2(a) to 2(i) and 3(a) to 3(c).

Furthermore, the above example is not limited to the present invention. For example, when the polarity of an output signal of the differential circuit 23 is inverted and a differential value thereof exceeds a predetermined value, the zero-cross detection circuit 24 could be constructed so as to generate the trigger signal S8. In the case of FIGS. 3(a) ato 3(c), the predetermined value can be set at a value which exceeds a negative value slightly less than zero. This case can further improve the reliability in the detection of the track middle point. The timing for inverting the polarity of the tracking control in the inversion circuit 17 is not limited to the timing of the above example. The polarity of the tracking control may be simply inverted, while the tracking control is non-operational in the jumping scan. For example, the timing operation may be simultaneously with the operation for the tracking control, after the deceleration drive pulse S9 is completed. Since the coil of the tracking actuator 11 has low pass filter characteristics, the low pass filter 20 can be omitted. It is not necessary to respectively construct the inversion circuit 17, phase compensation circuit 18, PWM circuit 19, low pass filter 20, differential circuit 23, and zero-cross detection circuit 24 as a hardware. For example, the use of a digital signal processing processor (DSP) can realize the same function as a software.

EXAMPLE 2

Figure 6:
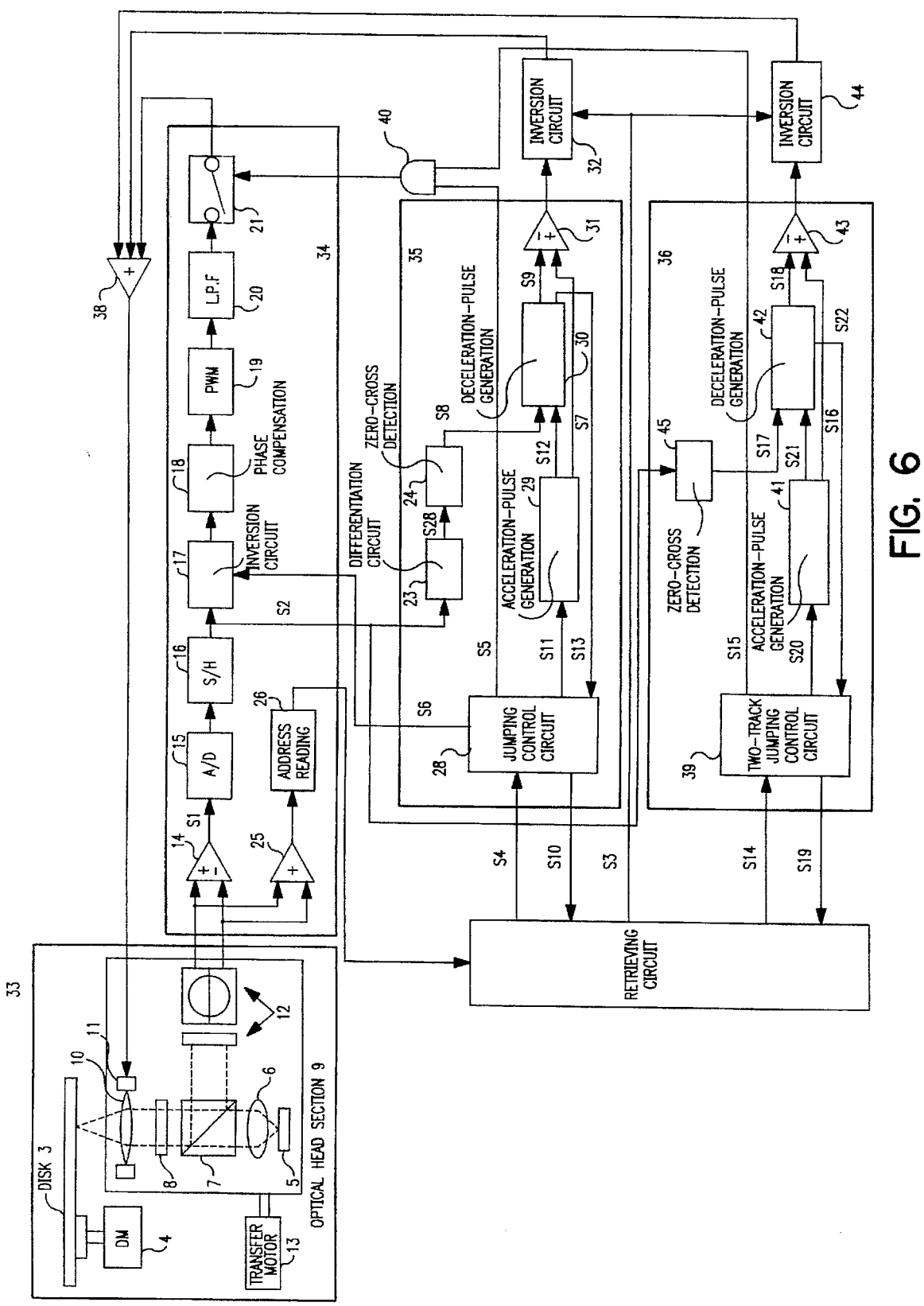
FIG. 6 is a structural diagram of a track retrieving apparatus of a second example of the present invention.

FIG. 6 is a structural diagram of a track retrieving apparatus, in which a jumping scanning method of the present invention is realized as a second example. In the description of this example, the components identical to those in Example 1 are numbered by the same reference numerals, and description thereof will be omitted. Also, the disk used in this example is quite the same as that of Example 1.

The track retrieving apparatus of this example is a combination of the track retrieving apparatus shown in FIG. 1 and the conventional jumping scan for shifting a light beam from one track to another. By such a structure, a time period required for the retrieving operation in an L/G disk can be greatly shortened, compared with the case of Example 1.

As is shown in FIG. 6, this track retrieving apparatus is generally split into four blocks. Among these 4 blocks, the disk/head block 33 consisting of the disk 3, the optical head section 9, the transfer motor 13 and the like; the tracking control block 34 consisting of a circuit for the tracking control and a circuit for reading the address; and the jumping scanning block 35 for performing a jumping scan for one track, they all have the same structure and operation as those in Example 1, and the description thereof will be omitted. In this example, a two-track jumping scanning block 36 for performing a jumping scan from one groove track to another groove track or a jumping scan from one land track to another land track is newly provided.

This two-track jumping scanning block 36 includes a two-track jumping control circuit 39, an acceleration-pulse generation circuit 41, a deceleration-pulse generation circuit 42, a differential circuit 43 and a zero-cross detection circuit 45.

In accordance with provision of the two-track jumping scanning block 36, in place of the retrieving circuit 27 and the addition circuit 22 of Example 1, a retrieving circuit 37 and a 3-input addition circuit 38 are respectively provided. The retrieving circuit 37 has the structure and function of controlling the two-track jumping scanning block 36, in addition to the structure and function of the retrieving circuit 27 of Example 1. Specifically, from the retrieving circuit 37, a two-track jumping starting signal S14 to the two-track jumping scanning block 36 and the jumping direction signal S3 to an inversion circuit 44, which are signals to the two-track jumping scanning block 36, are output in addition to the jumping command signal S4 to the jumping control circuit 28 and the jumping direction signal S3 to the inversion circuit 32, which are signals to the jumping scanning block 35. Further, to the retrieving circuit 37, a two-track jumping completion signal S19 from the two-track jumping control circuit 39 is input, in addition to the jumping completion signal S10 from the jumping control circuit 28.

When receiving the two-track jumping starting signal S14 from the retrieving circuit 37, the two-track jumping control circuit 39 outputs the required several kinds of command signals and implements the jumping scan for a track apart from two tracks, thereby outputting the jumping completion signal S19 to the retrieving circuit 37, after the jumping scan is completed. From the two-track jumping control circuit 39, an acceleration starting signal S20 is outputted to the acceleration-pulse generation circuit 41, and a tracking control ON/OFF signal S15 is outputted to an AND gate 40.

On the other hand, the output signal 52 of the A/D converter 16 in the tracking control block 34 is also inputted also into the zero-cross detection circuit 45. The zero-cross detection circuit 45 detects a zero cross of its input signal S2, thereby outputting a trigger signal S17 to the deceleration-pulse generation circuit 42. The deceleration-pulse generation circuit 42 outputs a deceleration drive pulse S18 to an inversion terminal of the differential circuit 43, and the acceleration-pulse generation circuit 41 outputs an acceleration drive pulse S16 to a non-inversion terminal of the differential circuit 43. In the differential circuit 43, the difference between the deceleration drive pulse S18 and the acceleration drive pulse S16 is calculated and inputted into the tacking actuator 11 via the inversion circuit 44 and 3-input addition circuit 38. As a result, the light beam 1 can be driven in the radius direction of the disk.

The acceleration-pulse generation circuit 41 outputs an acceleration completion signal S21 to the deceleration-pulse generation circuit 42, and the deceleration-pulse generation circuit 42 outputs a deceleration completion signal S22 to the two-track jumping control circuit 39. Also the tracking control ON/OFF signal S5 from the jumping control circuit 28 is inputted into the AND gate 40. In the AND gate 40, a logical product of the signal 5 and tracking control ON/OFF signal S15 from the two-track jumping scanning block 36 is calculated, thereby being inputted into the switch 21 within the tracking control block 34. A jumping drive pulse from the jumping scanning block 35 and a tracking control drive pulse from the tracking control block 34 are also inputted, via the inversion circuit 32 and the switch 21, respectively, into the 3-input addition circuit 38, where the three inputs are added together. The three-added input is outputted to the tracking actuator 11. Into the inversion circuit 44, as well as into the inversion circuit 32, the jumping directional signal S3 is inputted as its control signal.

The track retrieving operation in such a retrieving apparatus will be described below.

Before the jumping scan commences, the address of a target track is inputted into the retrieving circuit 37 by an external command means. When the address of the target track is inputted, the retrieving circuit 37 gains through the address reading circuit 26 the address of the track, on which the light beam 1 is currently located. Then, the circuit 37 calculates the number N of the tracks to be crossed and determining the direction of the jumping scan. In accordance with the determined direction of the jumping scan, the retrieving circuit 37 sets the jumping directional signal S3. Now, assuming that the track retrieving operation toward the internal circumference direction is performed, the jumping directional signal S3 is set at a Low level. The retrieving circuit 37 first performs the two-track jumping scan for $N_2$ times and then the one-track jumping scan for $N_1$ times, thereby achieving a shift of N tracks. Here, $N_1$ and $N_2$ satisfy the following relationships:

| i) N:even number | $N_1 = 0$ |
| | $N_2 = N/2$ |
| ii) N:odd number | $N_1 = 1$ |
| | $N_2 = (N - 1)/2$ |

No description will be given to the one-track jumping scan of $N_1$ times, since it is the same as of Example 1. The operation of the two-track jumping scan of $N_2$ times will be described in detail with reference to the timing chart of FIGS. 7(a) to 7(i).

Figure 7:
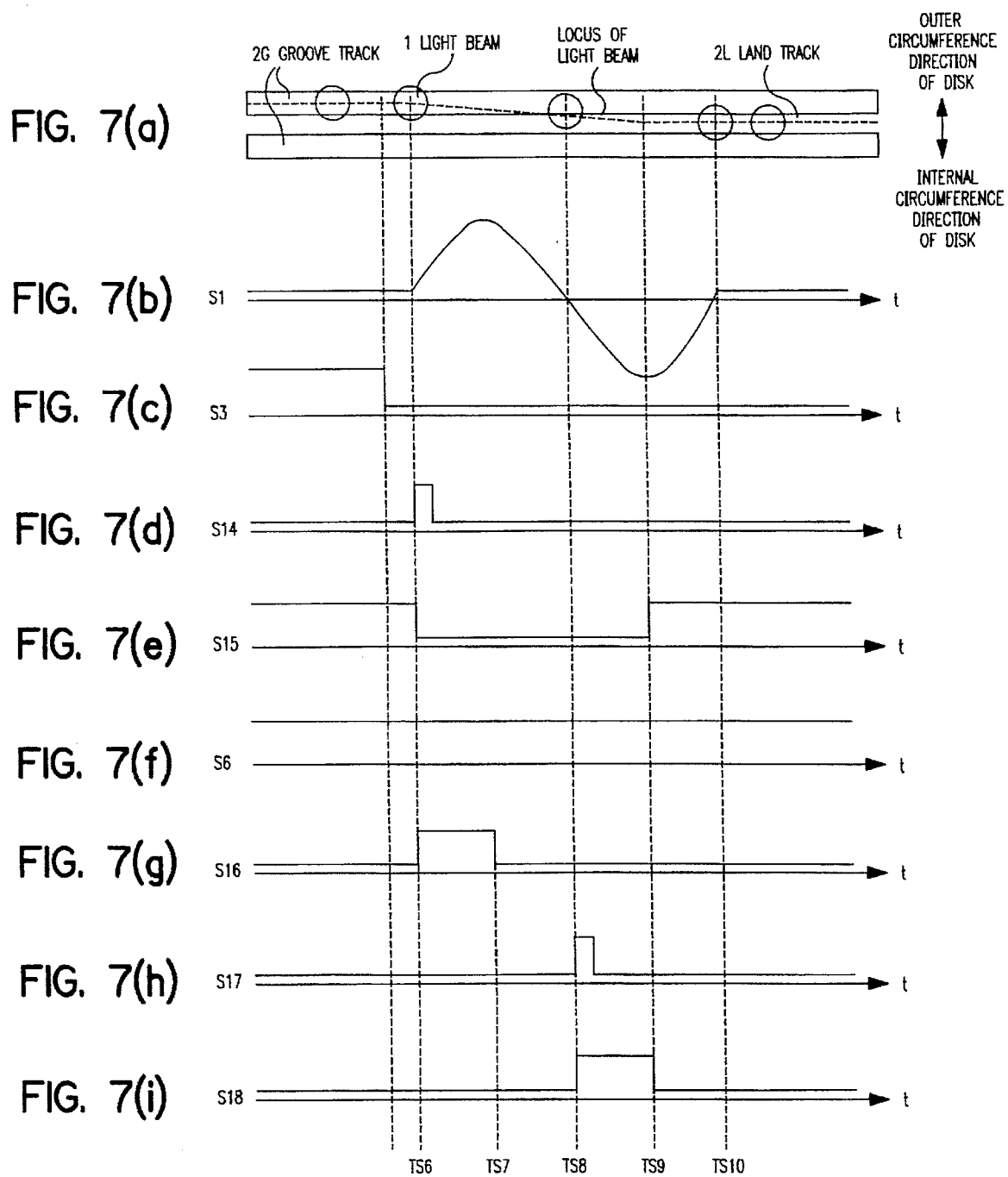
FIGS. 7(a) to 7(i) are timing charts of a track retrieving operation.

FIG. 7(a) is an enlarged plan view of the track on the disk 3, which shows two groove tracks 2G and a land track 2L sandwiched therebetween. In this figure, the vertical direction corresponds to a radius direction of the disk 3, and an upper direction corresponds to an outer circumference direction. The two-track jumping scan, in which the light beam 1 is shifted from the groove track 2G to another groove track 2G which is on the internal circumference side, the latter groove track 2G being 2 tracks apart from the former groove track 2G, will be described here as an example. In this case, a locus of the light beam 1 is drawn in a dotted line in FIG. 7(a).

FIGS. 7(b) to 7(i) show a timing chart of respective signals each corresponding to the locus position of the light beam 1 shown in FIG. 7(a). That is, FIG. 7(b) is the timing chart of the tracking error signal S1 ; FIG. 7(c) is the timing chart of the jumping directional signal S3; FIG. 7(d) is the timing chart of the two-track jumping command signal S14; FIG. 7(e) is the timing chart of the tracking control ON/OFF signal S15 outputted from the two-track jumping control circuit 39; FIG. 7(f) is the timing chart of the tracking polarity signal S6 outputted from the two-track jumping scanning block 36; FIG. 7(g) is the timing chart of the acceleration drive pulse S16 outputted from the acceleration-pulse generation circuit 41; FIG. 7(h) is the timing chart of the trigger signal S17 outputted from the zero-cross detection circuit 42; and FIG. 7(i) is the timing chart of the deceleration drive pulse S18 outputted from the deceleration-pulse generation circuit 42.

Before the two-track jumping scan commences, the tracking control ON/OFF signal S5 outputted from the jumping control circuit 28 and the tracking control ON/OFF signal S15 outputted from the two-track jumping control circuit 39 are both in a High level. Accordingly, an output of the AND gate 40, into which the both signals S5 and S15 are inputted, is in a High level. The switch 21 is closed and the tracking control remains operational. Moreover, in the jumping scanning block 35, the tracking polarity signal S6, which is inputted from the jumping control circuit 28 to the inversion circuit 17, is in a High level. In this case, the inversion circuit 17 has the polarity such that the light beam 1 is pulled into the groove track 2G by the tracking control. That is, the circuit 17 inputs an input signal without the inversion operation. Output signals of the acceleration-pulse generation circuits 29 and 41, and the deceleration-pulse generation circuits 30 and 42 are respectively in a zero level, so that the output signal from the differential circuit 31 and 43 are also in a zero level. In this case, the tracking error signal S1 outputted from the differential circuit 14 is almost in a zero level, and the light beam 1 is always on a certain track without causing a large control error.

As shown in FIG. 7(d), the retrieving circuit 37 sets the jumping command signal S14 at a High level at the timing of TS6, and then immediately sets it again at a Low level, thereby outputting a positive pulse. When detecting a rise edge of the two-track jumping command signal S14, the two-track jumping control circuit 36 outputs a positive pulse to the acceleration starting signal S20. Simultaneously, as shown in FIG. 7(e), the two-track jumping control circuit 36 sets the tracking control ON/OFF signal S15 at a Low level at the timing of TS7. By such a process, the output from the AND gate 40 is put in a Low level and the switch 21 is opened, thereby making the tracking control non-operational.

When a positive pulse is inputted as the acceleration starting signal S20 from the two-track jumping control circuit 39, the acceleration-pulse generation circuit 29 outputs the acceleration drive pulse S16 having a predetermined crest value and pulse width as shown in FIG. 7(g). The acceleration drive pulse S7 is inputted into the tracking actuator 11 via the differential circuit 43, inversion circuit 44, and 3-input addition circuit 38 in this order. The inversion circuit 44 is set so that the jumping directional signal S3 in a Low level and has the same polarity as that of the input signal, and the signal S3 in a Low level is inverted and outputted. As mentioned above, the jumping direction signal S3 is currently in a Low level, so that the inversion circuit 44 outputs a positive drive pulse having the same polarity as that of an input signal. In this case, the tracking actuator 11 is connected so that its own movable portion is shifted toward the internal circumference direction, which makes the light beam accelerated to shift from the groove track 2G toward the internal direction of the disk. After outputting the predetermined acceleration drive pulse S16 at the timing of TS7, the acceleration-pulse generation circuit 41 outputs the acceleration completion signal S21, thereby indicating the completion of the acceleration drive pulse S16 to the deceleration-pulse generation circuit 42.

As the light beam 1 is shifted, the level of tracking error signals S1 increases as shown in FIG. 7(b). When the light beam 1 reaches the land track 2L at the timing of TS8, the tracking error signal S1 becomes a zero level, and then the polarity is inverted. The zero-cross detection circuit 45 detects a zero cross of the tracking error signal S1, thereby outputting a positive pulse as a trigger signal S17 to the deceleration-pulse generation circuits 30, as shown in FIG. 7(h).

After the acceleration drive pulse S16 is completed, the deceleration-pulse generation circuit 42 detects a rise edge of an initial trigger signal S17, thereby outputting the deceleration drive pulse S18 having a predetermined crest value ad pulse width, as shown in FIG. 7(i). That is, in the time chart as shown in FIGS. 7(a) to 7(i) the deceleration drive pulse S18 is outputted from the timing of TS8. The deceleration drive pulse S18 is inverted in the differential circuit 43 and inputted into the tracking actuator 11 via the inversion circuit 44 and 3-input addition circuit 38. This decelerates the shift velocity of the light beam 1 toward the internal circumference direction regulated by the acceleration drive pulse S16.

After the deceleration drive pulse S18 is completed at the timing of TS9, the deceleration-pulse generation circuit 42 outputs the deceleration termination signal S22 to the two-track jumping control circuit 39. After the deceleration termination signal S22 is inputted into the two-track jumping control circuit 39, the circuit 39 immediately sets the tracking control ON/OFF signal S15 at a High level as shown in FIG. 2(e). This makes the switch 21 closed, thereby operating the tracking control. In this case, the light beam 1 is on the groove track 2G on the internal circumference side by two tracks; and the polarity of the tracking control is not changed after the two-track jumping scan commences. As a result, the light beam 1 can be smoothly pulled into the groove track 2G by the tracking control, leading to the completion of the two-track jumping scan.

After the two-track jumping scan is completed, the two-track jumping control circuit 39 outputs the jumping completion signal S19 to the retrieving circuit 37. In response to this process, the retrieving circuit 37 reduces the number of repetitions of the jumping scan by one, the number having been calculated for the light beam 1 so as to reach the target track before the retrieving operation. The retrieving circuit 37 repeats the two-track jumping scan, until the number of repetitions ($N_2$) becomes zero. Then, the one-track jumping scan is repeated for $N_1$ times to reach the target track in the same way as in Example 1, whereby the retrieving operation is completed.

This example describes the retrieving operation in which the jumping scan is repeated toward the internal circumference direction. The retrieving operation in the outer circumference direction will also be realized by repeating the two-track jumping scan and one-track jumping scan in the outer circumference direction. In this case, the retrieving circuit 37 should set the jumping directional signal S3 at a High level, before the retrieving operation commences. As a result, the inversion circuits 32 and 44 perform the inversion operation, whereby the retrieving operation toward the outer circumference direction will be realized.

EXAMPLE 3

Figure 8:
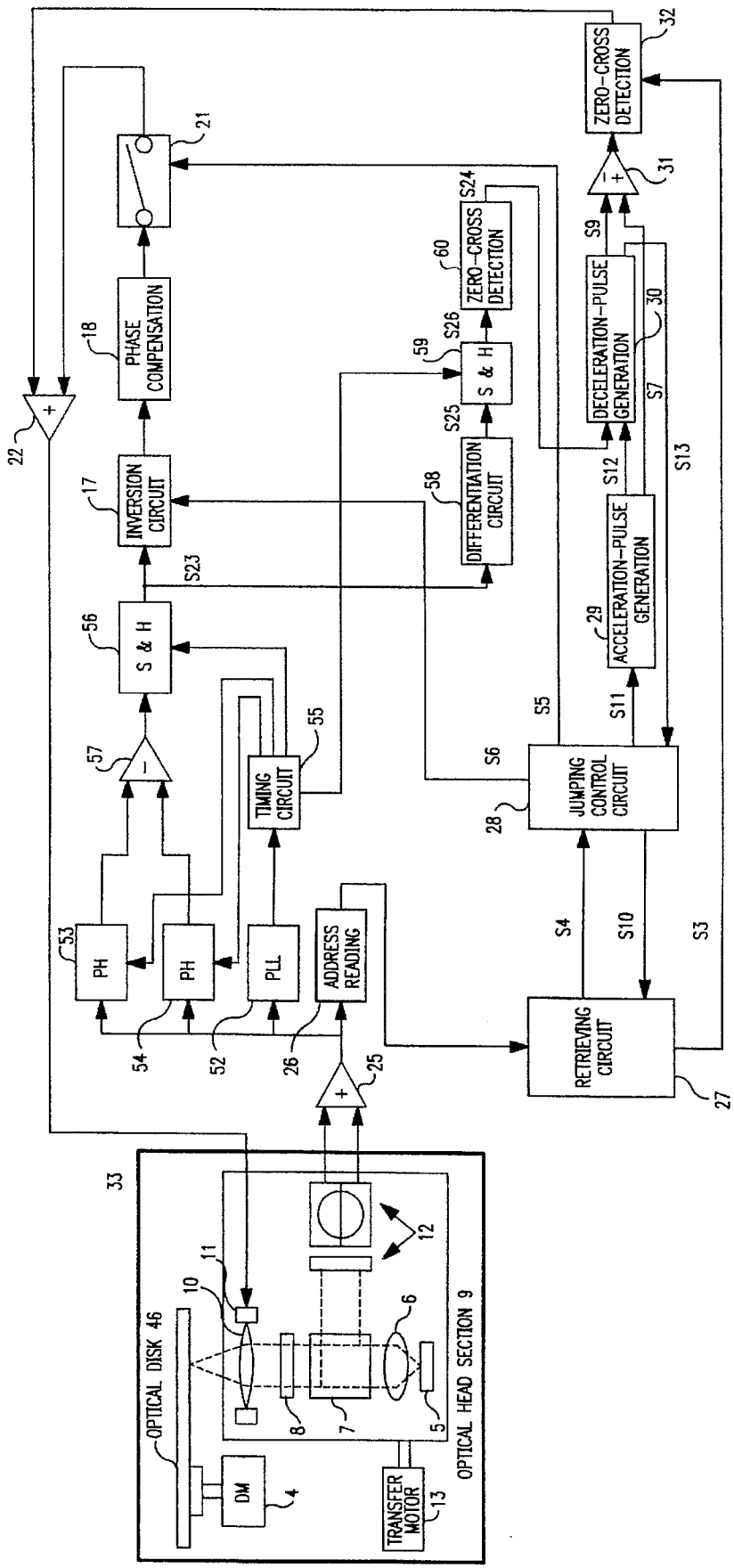
FIG. 8 is a structural diagram of a track retrieving apparatus as a third example of the present invention.

FIG. 8 shows a structure of a track retrieving apparatus in which the same effect as that in the above example can be obtained using a disk of a sample servo format (hereinafter, referred to as "an SS disk") in place of the L/G disk. First, the structure of the SS disk will be described before the track retrieving apparatus is structurally explained.

Figure 9A:
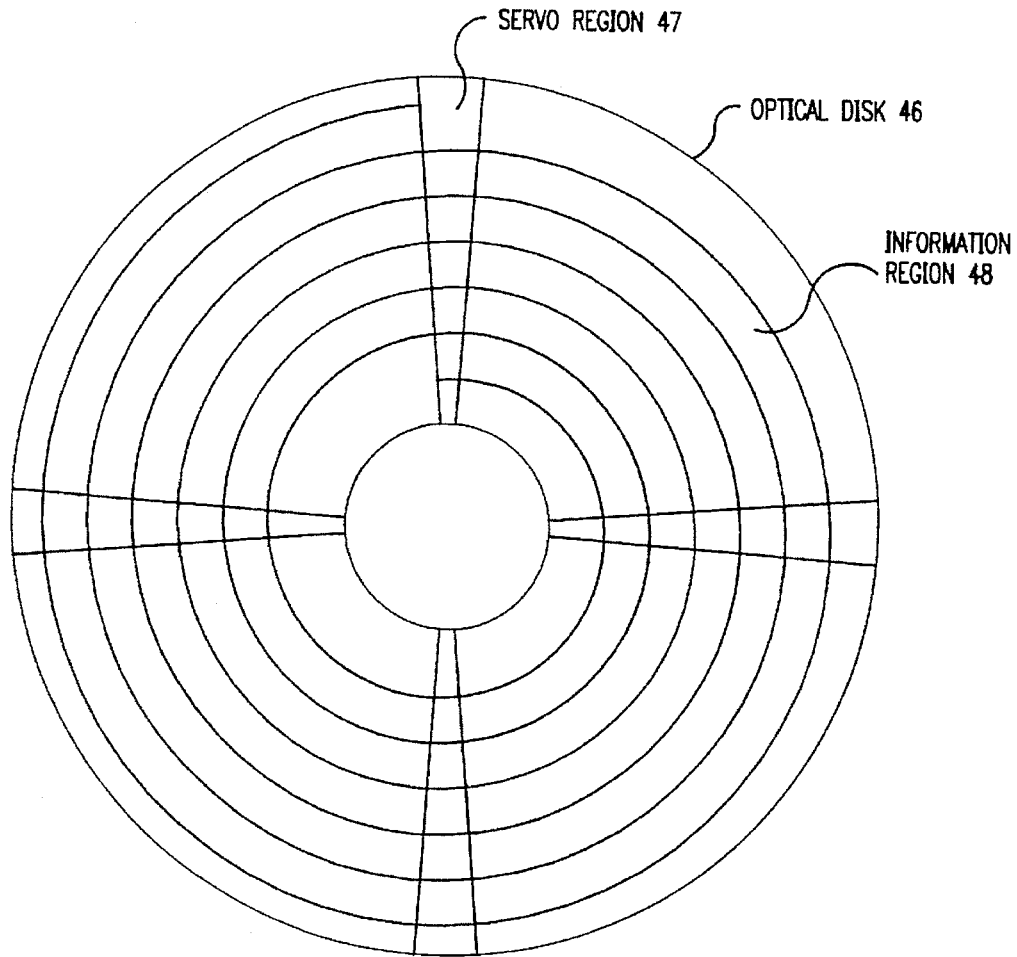
FIG. 9A is a plan view of an SS disk.

The physical format of an optical disk for use in a conventional SS system will be described. FIG. 9A is a plan view of the SS disk. A disk 46 is made of a resin substrate such as polycarbonate with a thickness of 1.2 mm. The substrate has tracks in a spiral shape in which servo regions 47 and information regions 48 are alternatively arranged. A reflective layer of aluminum or the like is formed on such a substrate by a vapor deposition method or the like. In the servo region 47, a servo signal for focus control and tracking control is obtained, such controls being required for the optical disk. Information is recorded in the information region 48. The plurality of the servo regions 47 and information regions 48 are provided for each circumference. For example, approximately 1500 servo regions 47 and information regions 48 are respectively formed at an uniform interval in a circumference direction. Moreover, respective groups of the servo regions 47 and the information regions 48 are positionally matched in a radius direction. That is, they are radially formed from the center of the disk 46 as shown in FIG. 9A.

Figure 9B:
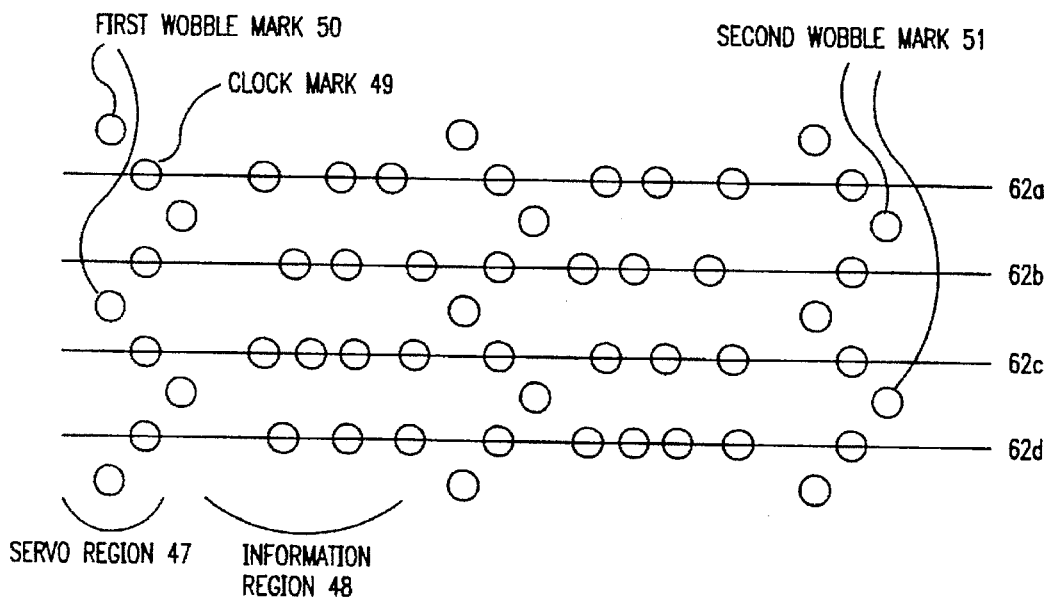
FIG. 9B is an enlarged plan view of a disk.
Figure 14A:
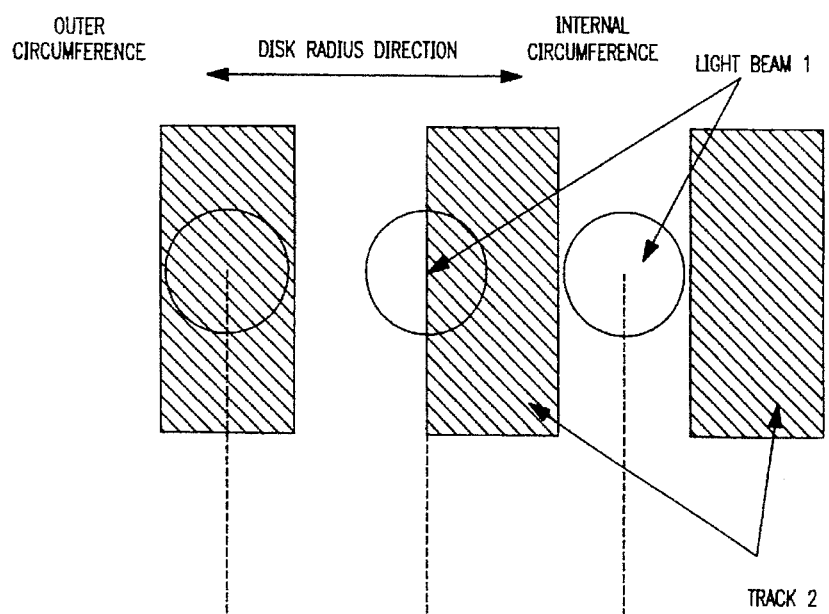
FIGS. 14(a) to 14(b) are diagrams showing the relationship of a tracking error signal and a positional relationship of a light beam and a track conventional jumping scan.
Figure 14B:
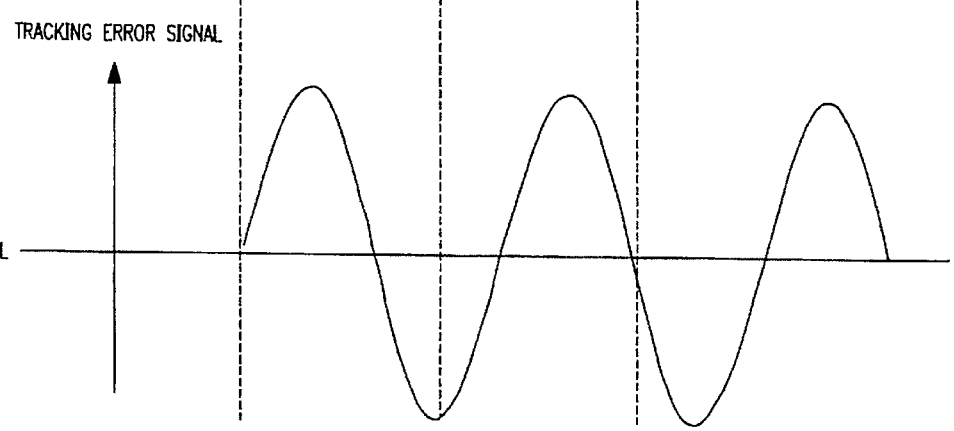

FIG. 9B is an enlarged plan view of the disk 46. The servo region 47 includes clock marks 49, first wobble marks 50, and second wobble marks 51. The clock marks 49 for synchronization are respectively provided on tracks 62a to 62d. The first wobble marks 50 and second wobble marks 51 are respectively in front of and behind the corresponding clock mark 49 in the direction of a track stretcher. Further, the first wobble mark 50 and the second wobble mark 51 are opposite on to the tracks 62a to 62d in a radius direction. Moreover, they are each in a middle point between the tracks. For example, the middle track 62b of the three tracks 62a to 62c and its adjacent track 62c have the common first wobble mark 50, and the tracks 62a and 62b have the common second wobble mark 51. A tracking error signal is obtained by the difference between a pair of peak levels of respective reproduction signals of the first wobble mark 50 and second wobble mark 51. In this case, the polarity of the tracking error signal is different between the tracks 62a and 62b. That is, the polarity of the tracking control alternatively differs for each rotation of the disk. Such a format of the disk 46 is referred to as an inversion wobble system. Since the detection method of the tracking error signal and its characteristics are known, for example, U.S. Pat. No. 5,012,460. Therefore a detailed description thereof will be omitted.

FIGS. 10(a) to 10(c) show the theoretically format on the disk 46, which explains how to arrange data on the disk. The track on the disk 46 has the servo regions 47 and information regions 48 alternatively arranged thereon and a pair of the servo region 47 and information region 48 forms one block, as shown in FIG. 10(a). Each sector includes (n+1) blocks as shown in FIG. 10(b). The information region 48 of the initial block in the sector becomes an address region, in which an address for distinguishing the sector (for example, a track number and a sector number) is recorded. Data is recorded in n blocks of the information regions 48 succeeding to the address region. One track includes m sectors as shown in FIG. 10(c), and a surplus region is included at the end of the track for a case where one track cannot be divided with one sector.

The structure of the track retrieving apparatus using the SS disk will be described with reference to FIG. 8. No description will be given to the structure and operation of the disk/head block 33 including the optical head section 9 in FIG. 8, because they are the same as those in FIG. 1 of Example 1. However, the disk 46 of the sample servo format is different form the disk 3 in FIG. 1.

An output signal of the two-divided photodetector 12 of the disk/head block 33 is added in the addition circuit 25. As a result, the sum of the power of the reflected light from the disk 46 is calculated and then inputted into a PLL circuit 52, peak hold circuits 53 and 54 (hereinafter, referred to as "a PH circuit"), and the address reading circuit 26. The PLL circuit 52 compares the signal of the transmitter in the circuit, with a read signal of the clock mark 49 in the servo region 47 which is detected in the two-divided photodetector 12, thereby controlling a difference in phase of both signals so as to have a predetermined relationship. Based on the output signal from the PLL circuit 52, a timing circuit 55 produces a timing signal for operating the PH circuits 53 and 54, and a sample-and-hold circuit 56. The PH circuit 53 detects the peak level of the first wobble mark 50 in the servo region, and the PH circuit 54 detects the peak level of the second wobble mark in the servo region. A differential circuit 57 outputs a level difference of both output signals of the PH circuits 53 and 54, i.e., a signal corresponding to an off-track between the track and light beam on the disk 46. The off-track signal is detected from a pair of wobble marks 50 and 51. Therefore, the regular number of rotation of the disk 46 would discretely output the off-track signal at a predetermined period.

Whenever the discrete off-track signal is outputted from the differential circuit 57, the sample-and-hold circuit 56 samples and holds the value of the signal, thereby outputting the tracking error signal S23 of a stage shape. The tracking error signal S23 is applied to the tracking actuator 11 via the inversion circuit 17, phase compensation circuit 18, switch 21, and addition circuit 22. The inversion circuit 17 is used for inventing the polarity of the tracking control; the phase compensation circuit 18 is used for obtaining control stability in the tracking control system; and the switch 21 is used for opening and closing the tracking-control loop. This application makes the tracking control operational, thereby controlling the light beam to be always in the center of the track.

The structures of operations of the retrieving circuit 27, jumping control circuit 28, acceleration-pulse generation circuit 29, deceleration-pulse generation circuit 30, differential circuit 31, and inversion circuit 32 are the same as those in FIG. 1 of Example 1.

In this example, the tracking error signal S23 from the sample-and-hold circuit 56 is inputted into a zero-cross detection circuit 60 via a differentiation circuit 58 and sample-and-hold circuit 59. The sample-and-hold circuit 59 samples and holds an input signal in response to the timing signal from the timing circuit 55. An output signal from the sample-and-hold circuit 59 is inputted into the zero-cross detection circuit 60. The circuit 60 detects a zero cross of the input signal, thereby outputting the trigger signal S24 to the deceleration-pulse generation circuit 30.

The track retrieving operation of this example will be described in detail by accompanying the timing chart of FIGS. 11(a) to 11(i). This timing chart is for use in the jumping scan toward the internal circumference direction for one track, the jumping scan being repeated during the retrieving operation.

FIG. 11(a) is an enlarged plan view of two adjacent tracks 61a and 61b on the disk 46. In this figure, a vertical direction corresponds to the radius direction of the disk 46 and an upper direction corresponds to the outer circumference direction. Here, the light beam 1 is shifted from the track 62a to the track 62b by the jumping scan. A locus of the light beam 1 is shown as a dotted line in FIG. 11(a).

FIGS. 11(b) to 11(i) are timing charts of respective loci of the light beam 1 of FIG. 11(a). FIG. 11(b) is the timing chart of the tracking error signal S23; FIG. 11(c) is the timing chart of the jumping directional signal S3; FIG. 11(d) is the timing chart of the jumping command signal S4; FIG. 11(e)

is the timing chart of the tracking control ON/OFF signal S5; FIG. 11(f) is the timing chart of the tracking polarity signal S6; FIG. 11(g) is the timing chart of the acceleration drive pulse S7 outputted from the acceleration-pulse generation circuit 29; FIG. 11(h) is the timing chart of the trigger signal S24 outputted from the zero-cross detection circuit 24 for detecting the track middle point; and FIG. 11(i) is the timing chart of the deceleration drive pulse S9 outputted from the deceleration-pulse generation circuit 30.

The procedure of the jumping scan of this example is the same in Example 1, except for the track middle-point detection. Only the timing charts are shown in FIGS. 11(a) to 11(i) and descriptions thereof are omitted.

FIGS. 12(a) to 12(d) is a timing chart for explaining the track middle-point detection during the jumping scan. FIG. 12(a) is the timing chart of the output signal S23 of the sample-and-hold circuit 56; FIG. 12(b) is the timing chart of the output signal S25 of the differentiation circuit 58; FIG. 12(c) is the timing chart of the output signal S26 of the sample-and-hold circuit 59; and FIG. 12(d) is the timing chart of the output signal S24 of the zero-cross detection circuit 60. In this figure, vertical dot lines show the timing when the timing signal is outputted from the timing circuit 55.

In the SS disk, off-track information is discretely detected from the servo regions 47, whose number is approximately 1500 for each rotation of the disk 46. Accordingly, the tracking error signal S23, which is outputted from the sample-and-hold circuit 56, draws a stage-shaped wave as shown in FIG. 12(a). As a result, an output wave of the differentiation circuit 58, which is obtained by differentiating the output signal S23 of the sample-and-hold circuit 56, becomes the chopping-wave shaped signal S25 as shown in FIG. 12(b). The sample-and-hold circuit 59 holds respective peak levels of the saw-tooth shaped signal S25 of the differentiation circuit 58. That is, a maximum value when the chopping-wave shaped signal S25 has a positive value, and a minimum value when the signal S25 has a negative value, thereby outputting the stage-shaped signal S26 as shown in FIG. 12(c). The zero-cross detection circuit 60 detects a change in the polarity of the output signal S26 of the sample-and-hold circuit 59 and also detects that the light beam 1 reaches the middle point between the tracks 62a and 62b. Then, a positive pulse as shown in FIG. 12(d) is outputted as the trigger signal S24 to the deceleration-pulse generation circuit 30, so that the detection of the track middle point is completed. After that, in response to the trigger signal S24 as shown in FIG. 11(h), the procedure performed after the output of the deceleration drive pulse S9 as shown in FIG. 11(i) is implemented, thereby completing the jumping scan in the same way as in Example 1.

Moreover, when the jumping scan is completed, the jumping control circuit 28 outputs the jumping completion signal S10 to the retrieving circuit 27. In response to this process, the retrieving circuit 27 reduces the number of repetitions of the jumping scan by one, the number having been calculated for the light beam 1 to reach the target track before the retrieving operation. The retrieving circuit 27 repeats the jumping scan until the number of the repetitions of the jumping scan becomes zero, thereby reaching the target track. Then, the retrieving operation is completed.

This example explains the retrieving operation for repeating the jumping scan toward the internal circumference direction. The retrieving operation toward the outer circumference is also realized by repeating the jumping scan toward the outer circumference direction. In this case, the retrieving circuit 27 sets the jumping directional signal S3 at a High level before the retrieving operation. Then, the inversion circuit 32 performs the inversion operation, thereby realizing the retrieving operation toward the outer circumference.

Furthermore, the track middle-point detecting method constituting the jumping scanning method of the present invention is useful in the L/G disk or the SS disk of the inversion wobble format. An exemplary application thereof will be described as below.

The track middle-point detecting method can be applied to a velocity detector for use in a track retrieving apparatus for a track retrieving in a long stroke. The track retrieving in a long stroke means a retrieving operation for distant tracks. For example, such a retrieving operation is realized by transferring the optical head section 9, shown in FIG. 1, in the radius direction of the disk 3 with the transfer motor 13. U.S. Pat. No. 4,106,058 and the like discloses in detail the track retrieving in a long stroke.

The track retrieving in a long stroke performs the velocity control for controlling the velocity of the light beam which is currently shifted. Because of this, the tracking control for a target track can be surely obtained, which is generally performed in a final stage of the track retrieving operation. The detection of the velocity of the light beam required for the velocity control is performed by measuring the period in which the light beam traverses the track, or a period in which the light beam traverses the middle point between the tracks. Detailed description thereof is found in U.S. Pat. No. 5,146,440 and the like. Accordingly, the use of the track middle-point detecting method of the present invention can realize the velocity detector for the track retrieving in the L/G disk or the SS disk of the inversion wobble format.

Various other modification will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A track retrieving method for making a light beam shift on a medium from an initial track to a target track, in an apparatus in which at least one of a writing operation and a reading operation of information is performed on the medium, a tracking control being applied to the light beam so as to make the light beam remain on one of a plurality of tracks, and wherein a polarity of the tracking control is alternatively inverted between the plurality of tracks, comprising the steps of:

performing at least one two-track jumping scan; and performing a one-track jumping scan only if the target track is an odd number of tracks away from the initial track, thereby making the light beam shift on the target track.

2. A track retrieving method according to claim 1, wherein:

said step of performing at least one two-track jumping scan repeats until the light beam shifts to one of the target track and a track adjacent to the target track; and said step of performing a one-track jumping scan is performed to shift the light beam onto the target track only in the case where the light beam 1s shifted to the track adjacent to the target track.

3. A track retrieving method according to claim 1, wherein the target track is N tracks apart from the initial track and the one-track jumping scan and the two-track jumping scan are performed for $N_1$ times and $N_2$ times, respectively, thereby making the light beam shift to the target track, wherein, $N_1$ and $N_2$ satisfy $N_1=0$ and $N_2=N/2$, in the case where N is an even number; and $N_1=1$ and $N_2=(N-1)/2$, in the case where N is an odd number.

4. A track retrieving method according to claim 1, wherein the one-track jumping scan includes the steps of:

making the light beam shift to an adjacent track, after the tracking control is made non-operational, detecting a tracking error between the light beam and one of the plurality of tracks, thereby generating a tracking error signal corresponding to the tracking error, generating a track middle-point signal corresponding to a differentiation signal obtained by calculating a differentiation of the tracking error signal, generating a deceleration pulse for decelerating a shift of the light beam, based on a change in a polarity of the track middle-point signal, inverting the polarity of the tracking control before the deceleration pulse is completed, and again operating the tracking control, after the deceleration pulse is completed.

5. A track retrieving method according to claim 4, wherein the step of generating the track middle-point signal includes a step of converting the tracking error signal into a digital signal and a step of generating the differentiation signal by calculating a differential of the digitally converted tracking error signal.

6. A track retrieving method according to claim 4, wherein in the step of generating the track middle-point signal, the differentiation signal is the same signal as the track middle-point signal.

7. A track retrieving method according to claim 1, wherein the two-track jumping scan includes the steps of:

making the light beam shift to an adjacent track, after the tracking control is made non-operational, detecting a tracking error between the light beam and one of the plurality of tracks, thereby generating a tracking error signal corresponding to the tracking error, generating a deceleration pulse for decelerating a shift of the light beam, based on a change in the polarity of the tracking error signal, and again operating the tracking control, after the deceleration pulse is completed.

* * * * *

UNITED STATES PATENT AND TRADE MARK OFFICE
CERTIFICATE OF CORRECTION

PATENT NO. : 5,650,984
DATED : July 22, 1997
INVENTOR(S) : Yamaguchi et al.

It is certified that error appears in the above-identified patent and that said Letters Patent is hereby corrected as shown below:

Column 22, line 63, delete "1s" and insert therefor, --is--.

Signed and Sealed this

Tenth Day of February, 1998

Attest:

BRUCE LEHMAN

*Attesting Officer*    *Commissioner of Patents and Trademarks*